US012744912B2

(12) United States Patent
Gao

(10) Patent No.: US 12,744,912 B2
(45) Date of Patent: Sep. 22, 2026

(54) METHOD AND APPARATUS OF ENCODING/DECODING POINT CLOUD GEOMETRY DATA USING AZIMUTHAL CODING MODE

(71) Applicant: Beijing Xiaomi Mobile Software Co., Ltd., Beijing (CN)

(72) Inventor: Shuo Gao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 399 days.

(21) Appl. No.: 18/552,320

(22) PCT Filed: Apr. 9, 2021

(86) PCT No.: PCT/CN2021/086263
§ 371 (c)(1),
(2) Date: Sep. 25, 2023

(87) PCT Pub. No.: WO2022/213388
PCT Pub. Date: Oct. 13, 2022

(65) Prior Publication Data

US 2024/0163451 A1 May 16, 2024

(51) Int. Cl.
*H04N 19/157* (2014.01)
*H04N 19/13* (2014.01)
(Continued)

(52) U.S. Cl.
CPC ........... *H04N 19/157* (2014.11); *H04N 19/13* (2014.11); *H04N 19/167* (2014.11); *H04N 19/184* (2014.11); *H04N 19/597* (2014.11)

(58) Field of Classification Search
CPC .... H04N 19/157; H04N 19/13; H04N 19/167; H04N 19/184; H04N 19/597
(Continued)

(56) References Cited

U.S. PATENT DOCUMENTS 12,444,088 B2 * 10/2025 Ramasubramonian ...................... G06T 9/001
2021/0209813 A1 * 7/2021 Hur ...................... H04N 19/105

FOREIGN PATENT DOCUMENTS

WO WO 2020010127 A1 1/2020
WO WO-2021262540 A1 * 12/2021 ............. G06T 17/20

OTHER PUBLICATIONS

International Organization for Standardization. G-PCC codec description. MPEG 3D Graphics Coding. Posted Dec. 31, 2020 at URL: https://mpeg-pcc.org/index.php/public-contributions/g-pcc-codec-description-is-updated-w-r-t-decisions-from-the-october-2020-meeting/ (Year: 2020).*

(Continued)

*Primary Examiner* — Jennifer Mehmood
*Assistant Examiner* — Eric James Shoemaker
(74) *Attorney, Agent, or Firm* — Finnegan, Henderson, Farabow, Garrett & Dunner, L.L.P.

(57) ABSTRACT

A method of encoding a point cloud into a bitstream of encoded point cloud data representing a physical object is provided. The method includes an azimuthal coding mode providing a series of bits for encoding a coordinate of a point of the point cloud. The method includes: dividing an interval, to which the point coordinate belongs to, into a left half interval and a right half interval; selecting a context based on an apparent angle ($AA_d$) representing an interval angle seen from a sensor that captured the point; and context-adaptive binary entropy encoding a bit ($b_d$) of the series of bits, into the bitstream, based on the selected context, the encoded bit ($b_d$) indicating which of the two half intervals the point coordinate belongs to.

13 Claims, 12 Drawing Sheets

(51) Int. Cl.
*H04N 19/167* (2014.01)
*H04N 19/184* (2014.01)
*H04N 19/597* (2014.01)

(58) Field of Classification Search
USPC .......................................................... 382/233
See application file for complete search history.

(56) References Cited

OTHER PUBLICATIONS

Graziosi D, Nakagami O, Kuma S, Zaghetto A, Suzuki T, Tabatabai A. An overview of ongoing point cloud compression standardization activities: video-based (V-PCC) and geometry-based (G-PCC). APSIPA Transactions on Signal and Information Processing. 2020;9:e13. doi: 10.1017/ATSIP.2020.12 (Year: 2020).*

International Search Report and Written Opinion of International Application No. PCT/CN2021/086263, mailed Sep. 30, 2021, 11 pages.

* cited by examiner

METHOD AND APPARATUS OF ENCODING/DECODING POINT CLOUD GEOMETRY DATA USING AZIMUTHAL CODING MODE

CROSS-REFERENCE TO RELATED APPLICATION

This application is a U.S. national phase application of International Patent Application No. PCT/CN2021/086263, filed on Apr. 9, 2021, the entire contents of which are incorporated herein by reference.

FIELD

The present application generally relates to point cloud compression and, in particular to methods and apparatus of encoding/decoding point cloud geometry data using azimuthal coding mode.

BACKGROUND

The present section is intended to introduce the reader to various aspects of art, which may be related to various aspects of at least one exemplary embodiments of the present application that is described and/or claimed below. This discussion is believed to be helpful in providing the reader with background information to facilitate a better understanding of the various aspects of the present application.

As a format for the representation of 3D data, point clouds have recently gained traction as they are versatile in their capability in representing all types of physical objects or scenes. Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allows for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

Virtual Reality and immersive worlds have become hot topics recently and are foreseen by many as the future of 2D flat video. The basic idea is to immerse the viewer in an environment that surrounds the viewer, in contrast to a standard TV in which the viewer can only look at the virtual world in front of the viewer. There are several gradations in the immersivity depending on the freedom of the viewer in the environment. A point cloud is a good format candidate for distributing Virtual Reality (VR) worlds.

The automotive industry and the autonomous car are also domains in which point clouds may be used. Autonomous cars should be able to "probe" their environment to make good driving decisions based on the reality of their immediate neighbors.

A point cloud is a set of points located in a tridimensional (3D) space, optionally with additional values attached to each of the points. These additional values are usually called attributes. Attributes may be, for example, three-component colors, material properties like reflectance and/or two-component normal vectors to a surface associated with a point.

A point cloud is thus a combination of a geometry (3D locations of the points in a 3D space represented by 3D cartesian coordinates x,y,z) and attributes.

Point clouds may be captured by various types of devices like an array of cameras, depth sensors, lasers (Light Detection And Ranging), scanners, or may be computer-generated (in movie post-production for example). Depending on the use cases, points clouds may have from thousands to up to billions of points for cartography applications. Raw representations of point clouds require a very high number of bits per point, with at least a dozen of bits per cartesian coordinate x, y or z, and optionally more bits for the attribute(s), for instance three times 10 bits for the colors.

It is important in many applications to be able to distribute dynamic point clouds to an end-user (or store them in a server) by consuming only a reasonable amount of bit-rate (or storage space for storage applications) while maintaining an acceptable (or preferably very good) quality of experience. Efficient compression of these dynamic point clouds is a key point in order to make the distribution chain of many immersive worlds practical.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the analysis of the compressed and transmitted point cloud.

Until recently, point cloud compression (aka PCC) was not addressed by the mass market and no standardized point cloud codec was available. In 2017, the standardization working group ISO/JCT1/SC29/WG11, also known as Moving Picture Experts Group or MPEG, has initiated work items on point cloud compression. This has led to two standards, namely:

- MPEG-I part 5 (ISO/IEC 23090-5) or Video-based Point Cloud Compression (V-PCC)
- MPEG-I part 9 (ISO/IEC 23090-9) or Geometry-based Point Cloud Compression (G-PCC)

The V-PCC coding method compresses a point cloud by performing multiple projections of a 3D object to obtain 2D patches that are packed into an image (or a video when dealing with moving point clouds). Obtained images or videos are then compressed using already existing image/video codecs, allowing for the leverage of already deployed image and video solutions. By its very nature, V-PCC is efficient only on dense and continuous point clouds because image/video codecs are unable to compress non-smooth patches as would be obtained from the projection of, for example, Lidar-captured sparse geometry data.

The G-PCC coding method has two schemes for the compression of a captured sparse geometry data.

The first scheme is based on an occupancy tree (octree) representation of the point cloud geometry. Occupied nodes are split down until a certain size is reached, and occupied leaf nodes provide the 3D locations of points. A leaf node is usually represented by a volume, typically a cube having a given size at a known 3D locations. The center of this volume may define the 3D location of one point. Alternatively, Inferred Direct Coding Mode (IDCM) may be used to code directly the 3D location of a point within a leaf node belonging to the occupancy tree. Sparse point clouds can benefit from the Inferred Direct Coding Mode (IDCM) by directly coding the 3D location of one or a few points within a node with non-minimal size, by stopping the tree construction when only isolated points are present in a node.

The second scheme is based on a predictive tree, each node representing the 3D location of one point and the relation between nodes is spatial prediction from parent to children. This method can only address sparse point clouds and offers the advantage of lower latency and simpler decoding than the occupancy tree. However, compression performance is only marginally better, and the encoding is complex, relatively to the first occupancy-based method, intensively looking for the best predictor (among a long list of potential predictors) when constructing the predictive tree.

In the first scheme, an azimuthal coding mode has been introduced to improve IDCM applied to a current leaf node. Basically, the azimuthal coding mode uses azimuthal angles of already coded points (belonging to already coded leaf nodes) to provide a series of bits for encoding a x or y-coordinate of a point of the point cloud. This very significantly improves the compression of the location of the point relative to the current leaf node. Firstly, an azimuthal coding direction (either along an x axis or an y axis of a horizontal plane), for which a coordinate of a current point P will be context-adaptive binary entropy encoded, is selected based on the x- and y-coordinate of the current point P (within a current leaf node) relative to the x and y axes. For example, the azimuthal coding direction is along the x axis if $|x_{node}|\leq|y_{node}|$ where $x_{node}$ and $y_{node}$ are the x- and y-coordinates representative of the current leaf node location, otherwise it is along the y axis. For example, $x_{node}$ and $y_{node}$ may be the x- and y-coordinates of the center of the current leaf node. Let us denote $(x_P, y_P, Z_P)$ the coordinates of the current point P. In case the selected azimuthal coding direction is along the x (respectively y) axis, the following coordinate encoding are processed:

First, the $y_P$ (respectively $x_P$) coordinate bits is coded,

Next, the $x_P$ (respectively $y_P$) coordinate bits is context-adaptive binary entropy encoded, and finally, the $z_P$ coordinate of the current point P is entropy encoded.

The first encoding $y_P$ (respectively $X_P$) may be performed using bypass entropy coding, i.e. bits representing $y_P$ (respectively $x_P$) are simply pushed into a bitstream. Alternatively, the first encoding $y_P$ (respectively $x_P$) may be performed using context-adaptive binary entropy coding.

On Figures, angles are depicted univocally as points on a line segment supporting an interval. To an angle corresponds a unique point on the line segment, and to any point corresponds a unique azimuthal angle. In the following, the azimuthal angle associated with a point is defined between, on one hand, the line joining the origin of a 2D (xy) horizontal plane to the point and, on the other hand, the x axis. This corresponds to the classical definition of azimuthal angles φ by $$\varphi=\text{atan }2(y_P,x_P)=\text{atan}(y_P/x_P).$$

The invention is not limited to this definition of azimuthal angles and may, for instance, use an alternative axis for origin (φ=0) of angles.

FIG. 1 illustrates a block diagram of steps of a method 100 of encoding a x-coordinate of a point using an azimuthal coding mode in case the azimuthal coding direction is along the x axis in accordance with prior art.

The method 100 is detailed when an azimuthal coding direction is along the x axis. An equivalent method may be deduced when the azimuthal coding direction is along the y axis by replacing the x-coordinate and x axis by the y-coordinate and y axis respectively and inversely.

In step 101, a current point P having $(x_P, y_P, Z_P)$ coordinates is picked in a current (leaf) node, and an azimuthal coding direction (here along the x axis) is selected along which one point coordinate (here $x_P$) will be context-adaptive binary entropy encoded in a bitstream B.

In step 102, the other point coordinate (here $y_P$) along the opposite direction (here the y axis) is bypassed entropy coded in a bitstream B.

In step 103, a predicted azimuthal angle $\varphi_{pred}$ is determined for the current point P. This predicted azimuthal angle $\varphi_{pred}$ is obtained from an azimuthal angle $\varphi_{al}$ of a (closest) already coded point and a multiple n of an elementary azimuthal shift Δφ representative of a sensor rotative sampling. The integer n may be chosen such as to obtain:

$$\varphi_{pred}=\varphi_{al}+n\Delta\varphi \quad (1)$$

as the closest possible angle (among all possible choices for n) from the azimuthal angle $\varphi_{center}$ center associated with the center of a current leaf node.

Thus, by construction, one has $$\varphi_{center}-\Delta\varphi/2\leq\varphi_{pred}\leq\varphi_{center}+\Delta\varphi/2 \quad (2)$$

In step 104, a x-interval along the azimuthal coding direction (here x axis) is initialized.

Graphically, as depicted on FIG. 2, in a 2D xy plane, this interval belongs to a line parallel to the azimuthal coding direction (here x axis), with opposite coordinate (here $y_P$) that has been already coded. The x-interval is the intersection of this line ($y=y_P$) and a current leaf node projection onto the 2D xy plane.

In step 105, the x-interval is divided into two half intervals: a left half interval and a right half interval. Two angles $\varphi_{left,d}$ and $\varphi_{right,d}$ are determined. The angle $\varphi_{left,d}$ is an angle associated with the left half interval, and the angle $\varphi_{right,d}$ is an angle associated with the right half interval.

In step 106, a context is selected based on the predicted azimuthal angle $\varphi_{pred}$ and the two angles $\varphi_{left,d}$ and $\varphi_{right,d}$.

For example, let's consider FIG. 3 that depicts an exemplary point whose position in an interval along the x-axis (selected azimuthal coding direction) is represented by 3 bits $b_d$ (d=1,2,3) representative of the position of the point among 8 possibilities. A first bit ($b_1$) equals to 0 if the coded point is one of the four points on the left and equals 1 if the coded point is one of the four points on the right. The predicted azimuthal angle $\varphi_{pred}$ provides some predictive information on the point position in the sense that, because the predicted azimuthal angle $\varphi_{pred}$ points to the left half interval, it is statistically more probable that the coded point belongs to the left half interval (i.e. $b_d=0$) than to the right half interval (i.e. $b_d=1$). One may simply profit from the information carried by the predicted azimuthal angle $\varphi_{pred}$ by comparing the angle differences $|\varphi_{pred}-\varphi_{left,d}|$ and $|\varphi_{pred}-\varphi_{right,d}|$, and then select a context accordingly. For example if $|\varphi_{pred}-\varphi_{left,d}|<|\varphi_{pred}-\varphi_{right,d}|$, select a first context to entropy code $b_d$, otherwise select a second context to entropy code $b_d$.

In step 107, the highest ordered remaining bit $b_d$ for $x_P$ is context-adaptive binary entropy encoded, into the bitstream B, by using the selected context. This bit $b_d$ indicates that $x_P$ is located either in the left half interval ($b_d=0$) or the right half interval ($b_d=1$).

In step 108, the x-interval is updated as the half interval to which $x_P$ belongs (as indicated by the coded bit $b_d$). If the coded bit $b_d$ equals 0, it indicates that $x_P$ is in the left half interval and the x-interval is updated as being the left half interval. If the coded bit $b_d$ equals 1, it indicates that $x_P$ is in the right half interval, and the interval is updated as being the right half interval.

Next, the method checks if $x_P$ encoding is completed or not. For example, the method checks if the updated interval size is lower or equals to a minimum x-interval size, or equivalently checks if all the bits $b_d$ are encoded.

If the $x_P$ coding is completed (i.e, for example, if the x-interval size is lower than or equals to the minimum x-interval size), in step 109, the remaining coordinate $z_P$ is coded into the bitstream B.

If the $x_P$ coding is not completed, loop to step 105 to code a next bit $b_{d+1}$ representative of $x_P$.

FIG. 4 illustrates updating the x-interval when a bit $b_d$ indicates that $x_P$ is within the right half interval. The right half interval at a current iteration (depth d−1) is then divided at the next iteration (depth d) into two half intervals in step 108.

In the current Test Model of the G-PCC standard, in step 105, the two angles $\varphi_{left,d}$ and $\varphi_{right,d}$ may be determined from positions $x_{left,d}$ and $x_{right,d}$ representative of (but not necessarily equal to) the middle of the two half intervals. A straightforward way to calculate the two angles is to use the arc tangent formulas as illustrated in FIG. 5.

$$\varphi_{left,d}=ia\tan 2(y_P,x_{left,d})$$

$$\varphi_{right,d}=ia\tan 2(y_P,x_{right,d})$$

The computational cost of computing two arc tangent functions may be an issue on some platforms.

To avoid computing two arc tangents for the coding of each bit $b_d$ of a point coordinate along an azimuthal coding direction, the G_PCC Test Model implementation uses specific locations of $x_{left,d}$ and $x_{right,d}$ as depicted on FIG. 6. Namely, $x_{left,d}$ is the lower (leftmost) bound of the x-interval and $x_{right,d}$ is the middle of the x-interval. By doing so, the updated (half) interval can inherit from one angle of its x-interval to obtain the updated angle $\varphi_{left,d}$ if $b_{d-1}=0$, angle $\varphi_{left,d}=\varphi_{left,d-1}$ if $b_{d-1}=1$, angle $\varphi_{left,d}=\varphi_{right,d-1}$ By doing so, only one arc tangent function is performed at each iteration (at each depth d) in order to compute $\varphi_{right,d}$.

In step 106 of the method 100, contexts are selected based on the predicted azimuthal angle $\varphi_{pred}$ and the two angles $\varphi_{left,d}$ and $\varphi_{right,d}$ for entropy coding x-interval (respectively y-interval) coordinate bits. The predicted azimuthal angle $\varphi_{pred}$ provides some predictive information on the point position in the sense that if the predicted azimuthal angle $\varphi_{pred}$ points to the left half interval, it is statistically more probable that the coded point belongs to the left half interval (i.e. $b_d=0$) than to the right half interval (i.e. $b_d=1$).

In G-PCC, 8 contexts are defined: 2 contexts depends on whether the signs of $m=(\varphi_{left,d}-\varphi_{pred})$ and $M=(\varphi_{right,d}-\varphi_{pred})$ are the same or not; 2 contexts depend on whether m>M or not and 2 contexts depend on whether M>2m or m>2M or not (neither M>2m nor m>2M).

FIG. 7 illustrates the G-PCC context selection process.

The x-interval is represented here at depth d, and angles $\varphi_{left,d}$ and $\varphi_{right,d}$ are respectively associated with the middle of the left half x-interval and the right half x-interval. Since there are 8 contexts in total, each context is represented by 3 bits $b_2b_1b_0$, and each bit bi indicates if one of the three conditions described above is fulfilled or not. As shown in FIG. 7, each context represents a possible position range that the predicted azimuthal angle $\varphi_{pred}$ belongs to in a current interval. If the predicted azimuthal angle $\varphi_{pred}$ points to the $1^{st}$ position range, then the context equals 010 and the current point has a higher possibility to be in left half x-interval at current depth d. In other words, this means that the probability that $b_d=1$, denoted prob($b_{d=1}$), is very low. If the predicted azimuthal angle $\varphi_{pred}$ points to rightmost $8^{th}$ position range, then the context equals 011 and the current point has a higher possibility to be in right half x-interval at current depth d. This means that prob($b_d=1$) is very high.

A context adaptive binary entropy coder (for example CABAC) is used to code the bit $b_d$. The coding probabilities, associated with each of the 8 contexts, will evolve naturally such that prob($b_d=1$)<0.5 for '010' context and prob($b_d=1$) >0.5 for the '011' context.

As a general rule, assuming p is the probability of the bit $b_d$ to be 1, the cost for coding 1 is −log 2(p), the cost for coding 0 is −log 2(1−p), and a good adaptive coding probability of bit $b_d$ can save cost in entropy encoding down to the Shannon entropy cost for the binary channel. If the predicted azimuthal angle $\varphi_{pred}$ can provide a good prediction of the interval to which the current point belongs to ($b_d=1$ or $b_d=0$), then the cost for entropy encoding the bit $b_d$ will be lowered.

In G-PCC, the predicted azimuthal angle $\varphi_{pred}$ is used to select contexts for entropy encoding bit $b_d$ together with angles $\varphi_{left,d}$ and $\varphi_{right,d}$. Selecting contexts thus depends on the prediction "quality" of the predicted azimuthal angle $\varphi_{pred}$. Quality is understood as the capability of the predicted azimuthal angle $\varphi_{pred}$ to anticipate correctly which half interval a current point belongs to. Entropy coding efficiency of the bits $b_d$ thus depends on the quality of the predicted azimuthal angle $\varphi_{pred}$.

The quality of the predicted azimuthal angle $\varphi_{pred}$ can be influenced by several factors such as the interval size and the distance r between a sensor of a spinning sensor head and the current node (current point). Some predicted azimuthal angle $\varphi_{pred}$ may be good or bad depending on the leaf node location and the leaf node size as explained in relation with FIGS. 8 and 9.

FIG. 8 illustrates examples of low quality of a prediction azimuthal angle $\varphi_{pred}$ caused by either too large or too small distance r, where the two nodes have the same node (interval) size, but they have different distance r from the sensor of the spinning sensor head.

As for the closest node (grey rectangle), the distance r between the sensor and the node is very small relative to the node size. Consequently, an apparent angle $\varphi_1$ associated with the x-interval is large and one gets $\varphi_1 \gg \Delta\varphi$. In this case, a point in the node may have been potentially probed by several (even many) sensor positions and the arbitrary choice of n in equation (1) is unlikely to be accurate at representing which position of the sensor has actually probed the current point. Also, a small change $\Delta x_{point}=\pm 1$ in the x position of the current point would induce a large change $\Delta\varphi_{point}$ in the azimuthal angle $\varphi$ associated with the point as one has $\Delta\varphi_{point}=\Delta x_{point}/r$ with a small radius r. This means that the azimuthal angle $\varphi$ of the current point is very sensitive to noise. This causes an unstable prediction behavior of the predicted azimuthal angle $\varphi_{pred}$.

As for the furthest node (black rectangle) on FIG. 8, the distance r between the sensor and the node is so large that $\varphi_2 \ll \Delta\varphi$ where $\varphi_2$ is an apparent angle associated with the x-interval.

Consequently, the bits $b_d$ provide a fine precision (smaller than $\Delta\varphi$) that cannot be well anticipated by the predicted azimuthal angle $\varphi_{pred}$ that has been determined up to $+/-\Delta\varphi/2$.

The good or bad prediction capability of the predicted azimuthal angle $\varphi_{pred}$ does not only depend on the distance between a sensor and the node but also depends on the node size as illustrated on FIG. 9.

FIG. 9 illustrates examples of low quality of a prediction azimuthal angle $\varphi_{pred}$ caused by too big (grey rectangle) or too small (black rectangle) apparent angles ($\varphi_1$ or $\varphi_2$) associated with the x-interval relative to $\Delta\varphi$. The two nodes shown in FIG. 9 have different node sizes (different x-interval size). For the big node (grey rectangle), the apparent angle $\varphi_1$ is so large that $\varphi_1 \gg \Delta\varphi$, and it will cause the same problem as for small distance r. For the small node (black rectangle), the apparent angle $\varphi_2$ is so small that $\varphi_2 \ll \Delta\varphi$, and it will cause the same problem as for large distance r.

The problem to solve is thus to improve the selection of contexts used for entropy coding bits $b_d$ to improve the context-based entropy coding used in the azimuthal coding mode.

At least one exemplary embodiment of the present application has been devised with the foregoing in mind.

SUMMARY

According to a first aspect of the present invention, there is provided a method of encoding a point cloud into a bitstream of encoded point cloud data representing a physical object, the method comprising an azimuthal coding mode providing a series of bits for encoding a coordinate of a point of the point cloud. The method comprises dividing an interval, to which the point coordinate belongs to, into a left half interval and a right half interval; selecting a context based on an apparent angle representing an interval angle seen from a sensor that captured the point; and context-adaptive binary entropy encoding a bit of the series of bits, into the bitstream, based on the selected context, said coded bit indicating which of the two half intervals the point coordinate belongs to.

According to a second aspect of the present invention, there is provided a method of decoding a point cloud from a bitstream of encoded point cloud data representing a physical object, the method comprising an azimuthal coding mode providing a series of bits for decoding a coordinate of a point of the point cloud. The method comprises dividing an interval, to which the point coordinate belongs to, into a left half interval and a right half interval; selecting a context based on an apparent angle representing an interval angle seen from a sensor that captured the point; and context-adaptive binary entropy decoding a bit, from the bitstream, based on the selected context, said decoded bit indicating which of the two half intervals the point coordinate belongs to.

According to a third aspect of the present application, there is provided a computer program product including instructions which, when the program is executed by one or more processors, causes the one or more processors to carry out a method of encoding a point cloud into a bitstream of encoded point cloud data representing a physical object according to the first aspect of the present application.

The specific nature of at least one of the exemplary embodiments as well as other objects, advantages, features and uses of said at least one of exemplary embodiments will become evident from the following description of examples taken in conjunction with the accompanying drawings.

BRIEF DESCRIPTION OF THE DRAWINGS

Reference will now be made, by way of example, to the accompanying drawings which show exemplary embodiments of the present application, and in which.

Similar reference numerals may have been used in different figures to denote similar components.

DESCRIPTION OF EXEMPLARY EMBODIMENTS

At least one of the exemplary embodiments is described more fully hereinafter with reference to the accompanying figures, in which examples of at least one of the exemplary embodiments are illustrated. An exemplary embodiment may, however, be embodied in many alternate forms and should not be construed as limited to the examples set forth herein. Accordingly, it should be understood that there is no intent to limit exemplary embodiments to the particular forms disclosed. On the contrary, the disclosure is intended to cover all modifications, equivalents, and alternatives falling within the spirit and scope of the present application.

When a figure is presented as a flow diagram, it should be understood that it also provides a block diagram of a corresponding apparatus. Similarly, when a figure is presented as a block diagram, it should be understood that it also provides a flow diagram of a corresponding method/process.

At least one of the aspects generally relates to point cloud encoding and decoding, and at least one other aspect generally relates to transmitting a bitstream generated or encoded.

Moreover, the present aspects are not limited to MPEG standards such as MPEG-I part 5 or part 9 that relate to the Point Cloud Compression, and may be applied, for example, to other standards and recommendations, whether pre-existing or future-developed, and extensions of any such standards and recommendations (including MPEG-I part 5 and part 9). Unless indicated otherwise, or technically precluded, the aspects described in the present application may be used individually or in combination.

The following section presents a simplified summary of at least one exemplary embodiment in order to provide a basic understanding of some aspects of the present application. This summary is not an extensive overview of an exemplary embodiment. It is not intended to identify key or critical elements of an embodiment. The following summary merely presents some aspects of at least one of the exemplary embodiments in a simplified form as a prelude to the more detailed description provided elsewhere in the document.

In brief, there is provided methods comprise an azimuthal coding mode providing a series of bits for encoding/decoding a coordinate of a point of a point cloud along an azimuthal coding direction. Contexts of a context-based entropy encoding/decoding are selected for encoding/decoding the bits of the series of bits. Context selection is based on an apparent angle ($AA_d$) associated with an interval along the azimuthal coding direction representing the coordinate of the point of the point cloud. The apparent angle ($AA_d$) estimates an interval angle seen from a sensor that captured the point at a particular depth. Selected contexts exhibit more accurate statistics for the probability of bits $b_d$ to 0 or 1 and context-based entropy coding of coordinates of points of a point cloud is improved.

Figure 10:
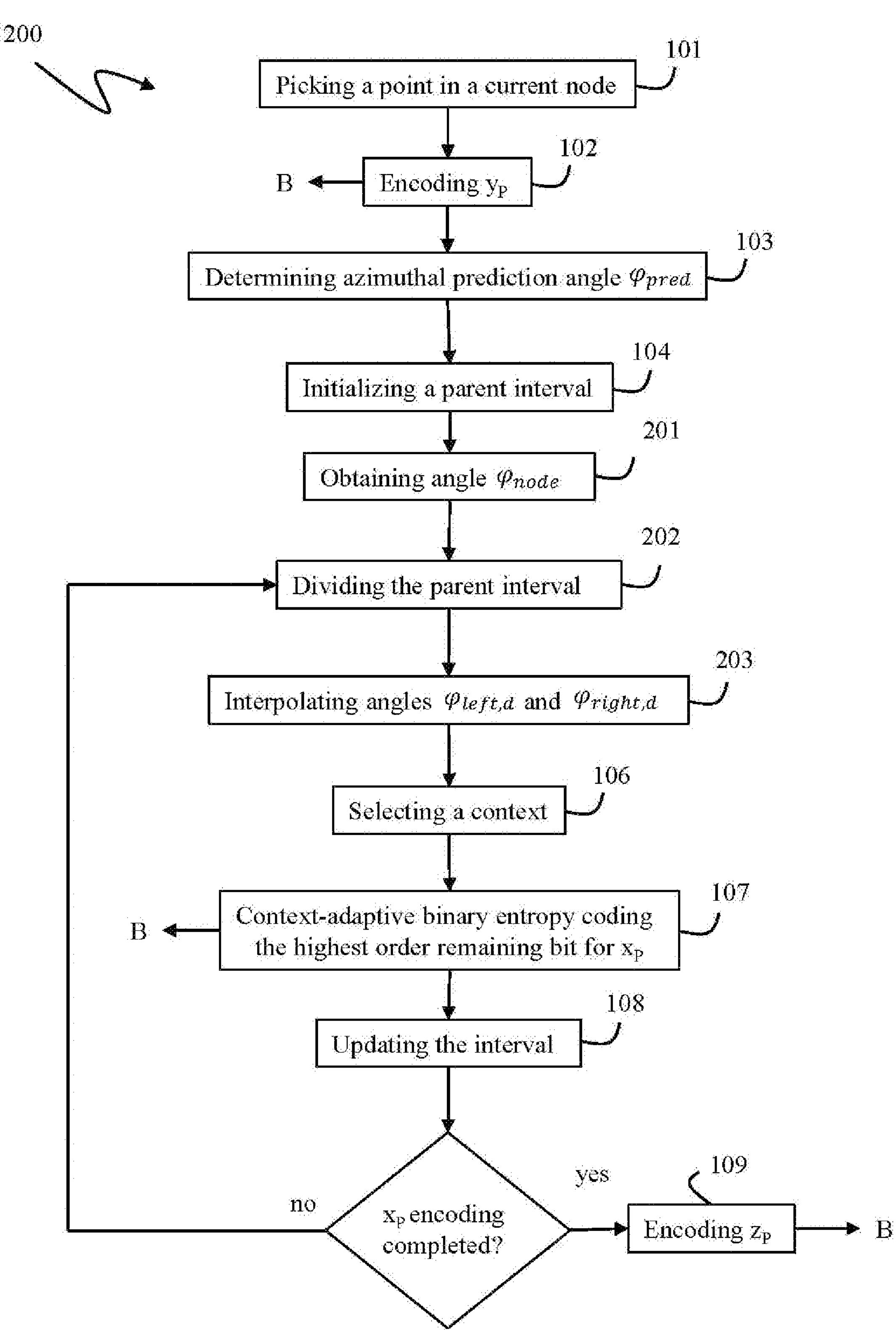
FIG. 10 illustrates a block diagram of steps of a method 200 of encoding a x-coordinate of a current point using an azimuthal coding mode in case the azimuthal coding direction is along the x axis in accordance with an exemplary embodiment of the present invention.

FIG. 10 illustrates a block diagram of steps of a method 200 of encoding a x-coordinate of a current point using an azimuthal coding mode in case the azimuthal coding direction is along the x axis.

Figure 1:
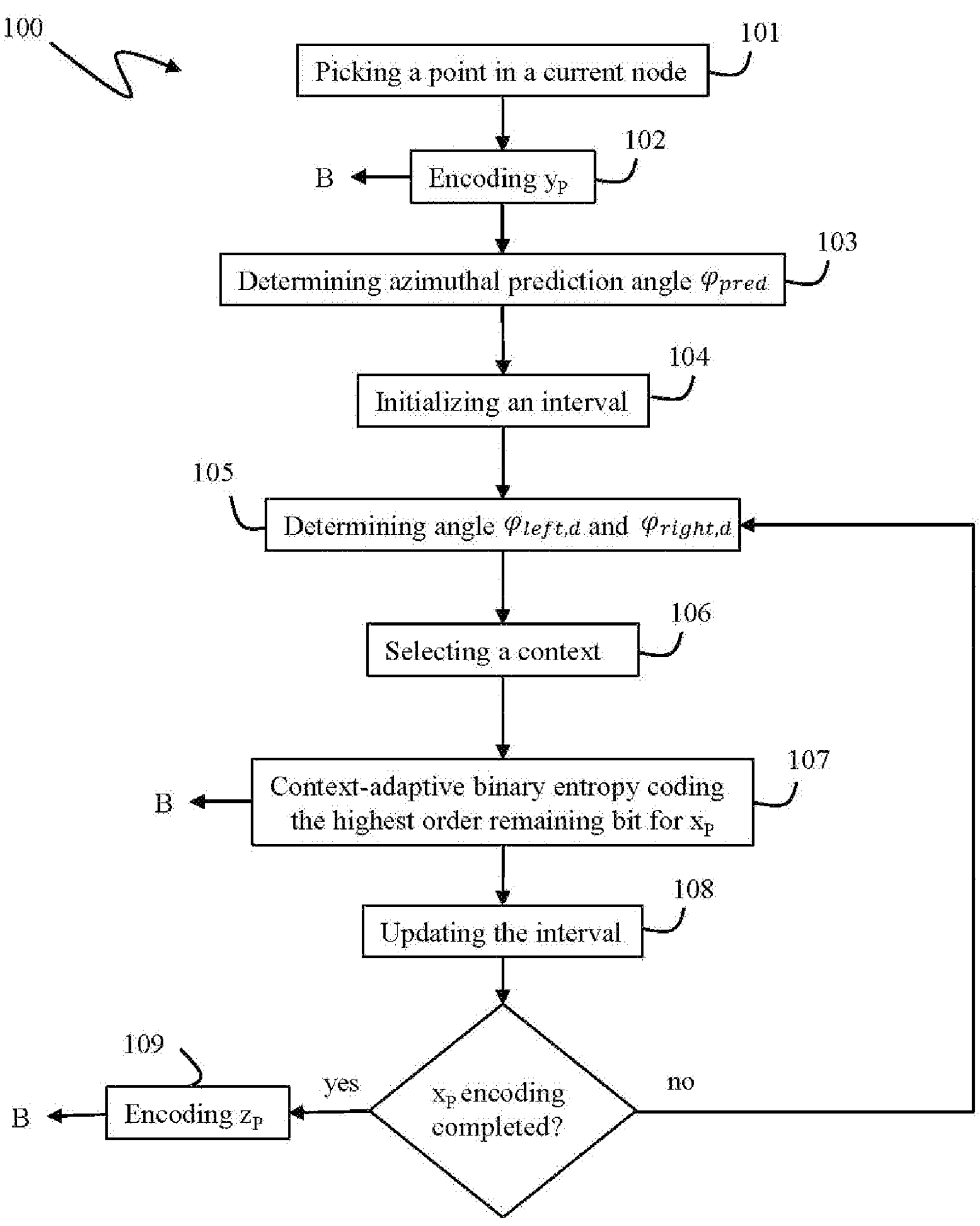
FIG. 1 illustrates a block diagram of steps of a method of encoding a x-coordinate of a point using an azimuthal coding mode in case the azimuthal coding direction is along the x axis in accordance with prior art.
Figure 2:
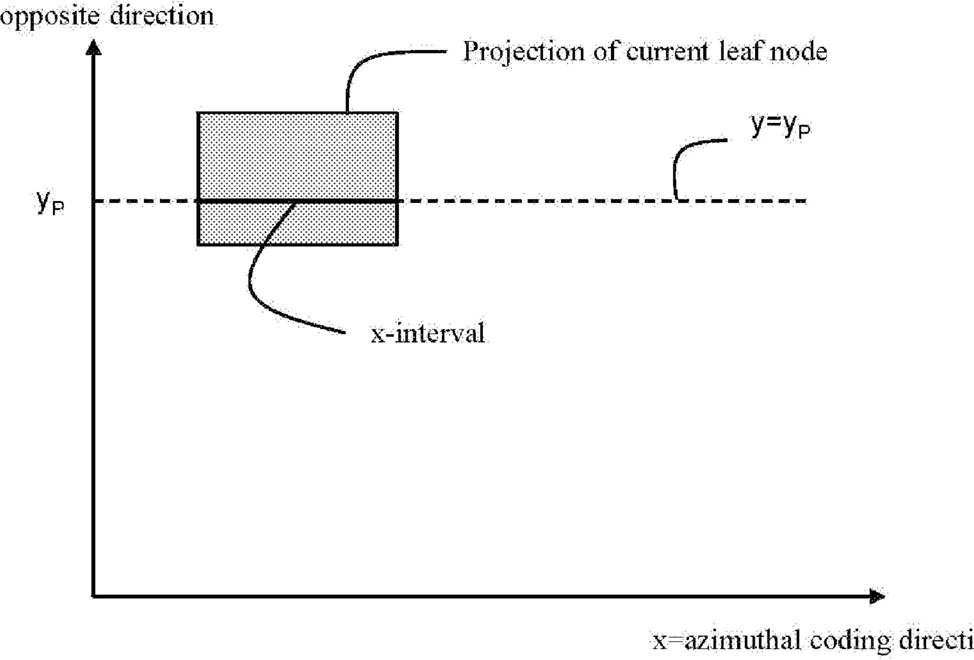
FIG. 2 illustrates the definition of an interval along an azimuthal coding direction in accordance with prior art.
Figure 3:
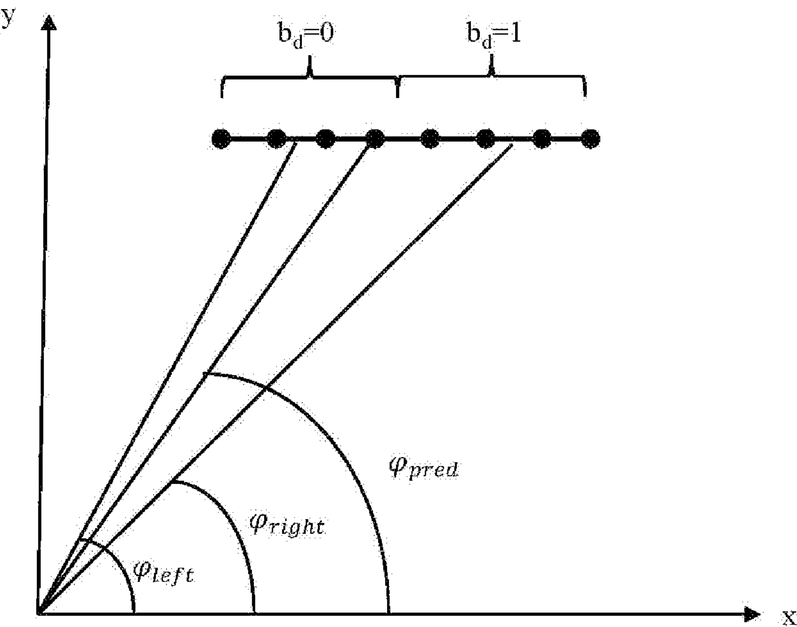
FIG. 3 illustrates updating an interval of the azimuthal coding mode of FIG. 1 when one point coordinate is predicted to belong to the left half interval in accordance with prior art.
Figure 4:
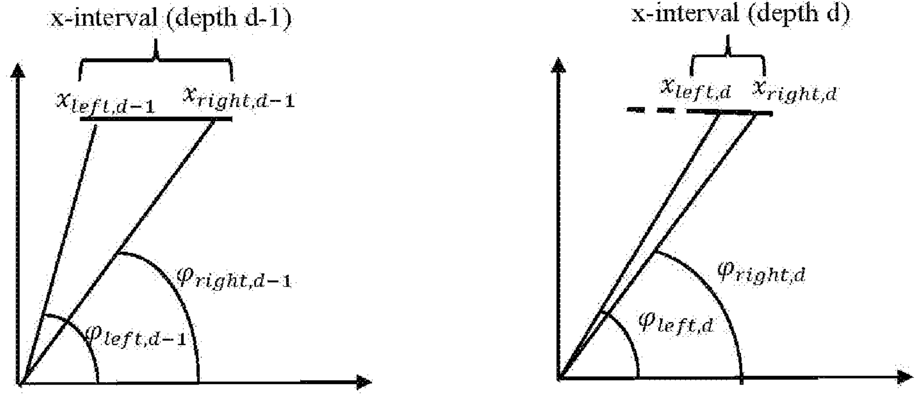
FIG. 4 illustrates updating the x-interval when a bit $b_d$ indicates that $x_P$ is within the right half interval in accordance with prior art.
Figure 5:
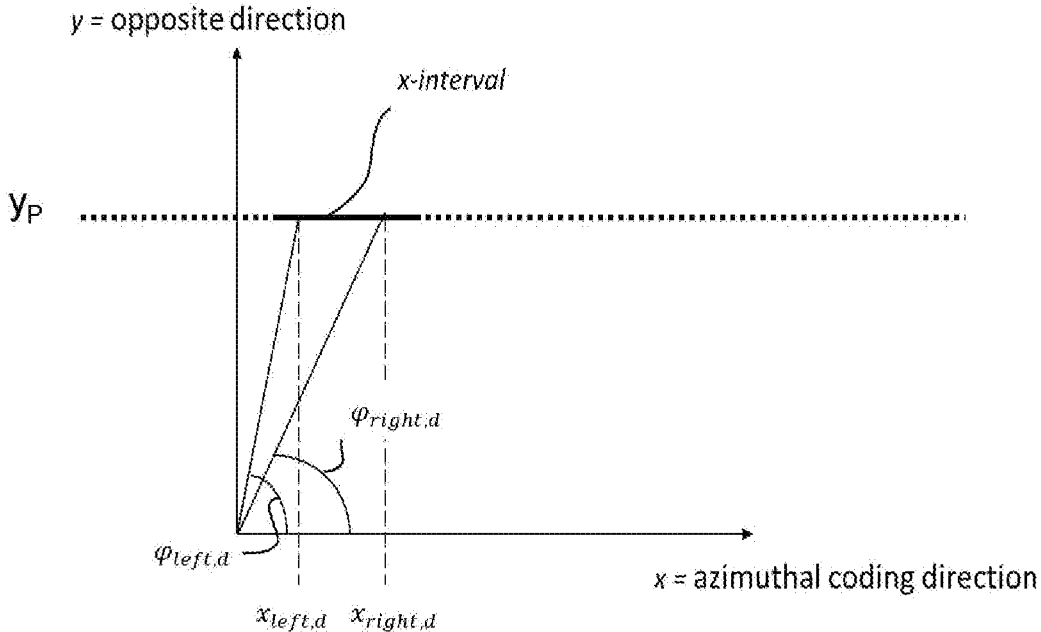
FIG. 5 illustrates an exemplary embodiment for determining two angles $\varphi_{left,d}$ and $\varphi_{right,d}$ in accordance with prior art.
Figure 6:
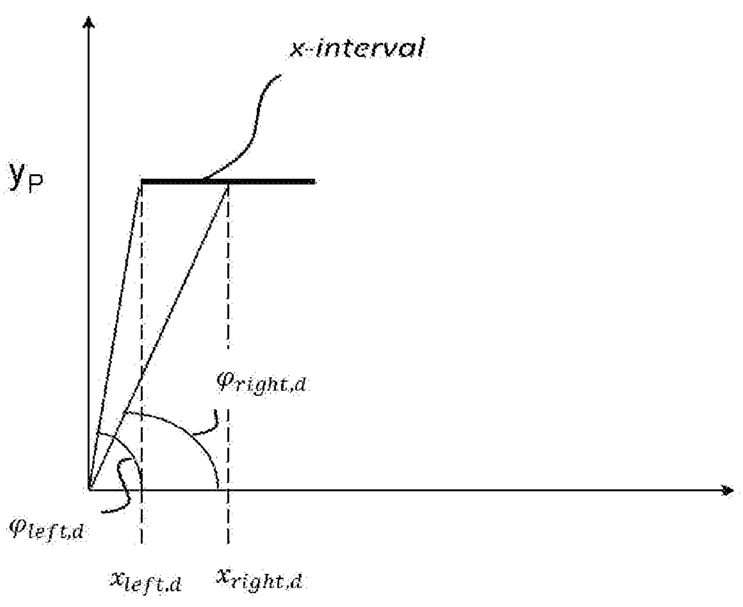
FIG. 6 illustrates an exemplary embodiment for calculating two angles $\varphi_{left,d}$ and $\varphi_{right,d}$ in accordance with prior art.

The method 200 is an improvement of the method 100 of FIG. 1. An exemplary current point P is picked in a current (leaf) node of an occupancy tree (step 101). The point position along a selected azimuthal coding direction is represented by bits $b_d$, each bit representing a position of $x_P$ in an x-interval along the x axis. In the following the selected azimuthal coding direction is along the x axis but an equivalent method 200 may be deduced when the azimuthal coding direction along the y axis by replacing the x-coordinate, x axis by y-coordinate and y-axis respectively and inversely. The other point coordinate (here $y_P$) is coded along the opposite direction (here the y axis) (step 102). A predicted azimuthal angle $\varphi_{pred}$ is determined for the point P (step 103). A x-interval along the x axis is initialized (step 104).

In step 201, an angle of the current node $\varphi_{node}$ is obtained. The angle $\varphi_{node}$ may be already known and obtained from a memory or computed by:

$$\varphi_{node}=ia\tan 2(y_P,\text{nodepos\_x}) \tag{3}$$

where nodepos_x is a given parameter of IDCM. For example, the parameter nodepos_x may be the lowest x coordinate value associated with the cube associated with the current node. The angle $\varphi_{node}$ is then associated with the lower bound of the initial x-interval.

In step 202, the x-interval is divided into two half intervals: left half interval and right half interval. The x-interval is either the initial x-interval obtained in step 104 or a x-interval used for encoding a previous bit $b_{d-1}$.

In step 203, a left angle $\varphi_{left,d}$ associated with the left half interval and a right angle $\varphi_{right,d}$ associated with the right half interval are interpolated from at least one inherited angle associated with the x-interval.

Figure 16:
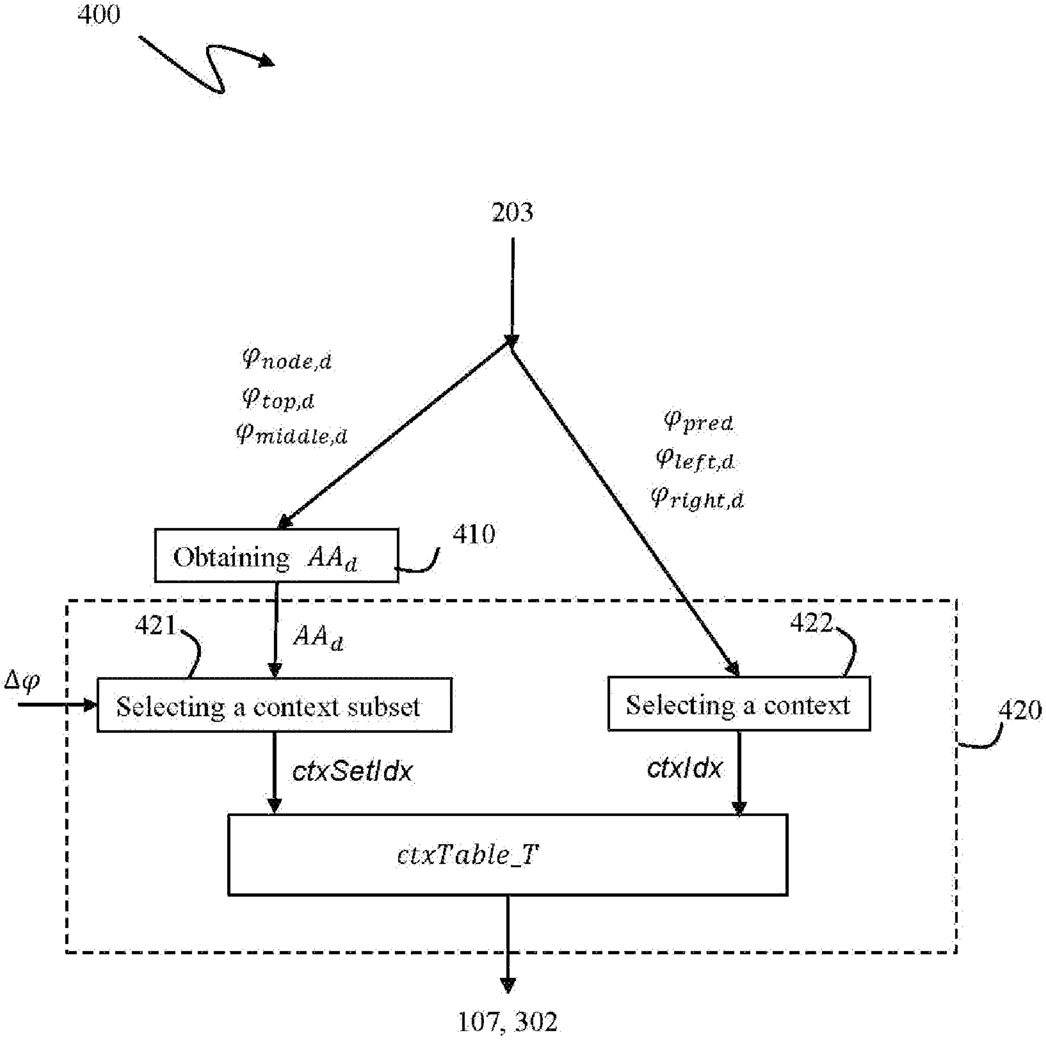
FIG. 16 illustrates a block diagram of steps of a method 400 of selecting a context in accordance with an exemplary embodiment of the present invention.

In step 106, a context is selected as described in relation with the method 400 of FIG. 16.

In step 107, the highest ordered remaining bit $b_d$ for $x_P$ is context-adaptive binary entropy encoded, into the bitstream B, by using the selected context. This bit indicates that $x_P$ is located either in the left half interval ($b_d=0$) or the right half interval ($b_d=1$).

In one exemplary embodiment, the context-adaptive binary entropy encoding is a Context-Adaptive Binary Arithmetic Coding (CABAC).

In step 108, the x-interval is updated as the half interval to which $x_P$ belongs (as indicated by the coded bit). If the coded bit $b_d$ equals 0, it indicates that $x_P$ is in the left half interval and the x-interval is updated as being the left half interval. If the coded bit $b_d$ equals 1, it indicates that $x_P$ is in the right half interval, and the x-interval is updated as being the right half interval.

Next, the method checks if $x_P$ encoding is completed or not.

If the $x_P$ coding is completed, in step 109, the remaining coordinate $z_P$ is coded into the bitstream B.

If the $x_P$ coding is not completed, loop to step 202 to code a next bit $b_{d+1}$ representative of $x_P$.

In one exemplary embodiment of step 203, the left angle $\varphi_{left,d}$ is interpolated by adding a first angle ($\varphi_{1,d}$) with a weighted difference of a second angle ($\varphi_{2,d}$) and a third angle ($\varphi_{3,d}$), and the right angle ($\varphi_{right,d}$) is interpolated by adding a fourth angle ($\varphi_{4,d}$) with a weighted difference of a fifth angle ($\varphi_{5,d}$) and a sixth angle ($\varphi_{6,d}$).

Such an interpolation may be given by $$\begin{cases} \varphi_{left,d} = \varphi_{1,d} + Off_{left} * (\varphi_{2,d} - \varphi_{3,d}) / \text{size}_d \\ \varphi_{right,d} = \varphi_{4,d} + Off_{right} * (\varphi_{5,d} - \varphi_{6,d}) / \text{size}_d \end{cases} \tag{4}$$

where $\text{size}_d$ indicates the size of the interval delimited by the angles $\varphi_{2,d}$ and $\varphi_{3,d}$ ($\varphi_{5,d}$ and $\varphi_{6,d}$), $Off_{left}$ and $Off_{right}$ are parameters of the method and at least one of the angles $\varphi_{1,d}$, $\varphi_{2,d}$, $\varphi_{3,d}$, $\varphi_{4,d}$, $\varphi_{5,d}$, $\varphi_{6,d}$ is an inherited angle associated with the x-interval used for encoding a previous bit $b_{d-1}$ (previous iteration, at depth d−1). The x-interval used at depth d for encoding a bit $b_d$ is contained into the parent interval.

The angles $\varphi_{left,d}$ and $\varphi_{right,d}$ may not point systematically to the middle of the left and right half intervals. This provides flexibility into the choice of angles $\varphi_{left,d}$ and $\varphi_{right,d}$ by freely settings the values of the parameters $Off_{left}$ and $Off_{right}$.

Figure 11:
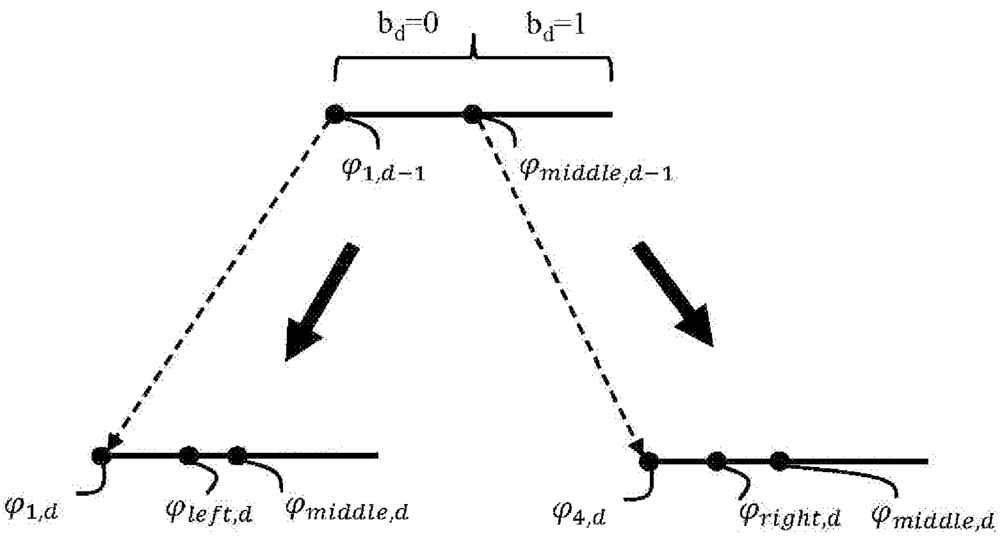
FIG. 11 illustrates an exemplary embodiment for interpolating two angles $\varphi_{left,d}$ and $\varphi_{right,d}$ in accordance with at least one exemplary embodiment.

In one exemplary embodiment of step 203, illustrated on FIG. 11, the angles $\varphi_{1,d}$, $\varphi_{2,d}$, $\varphi_{3,d}$, $\varphi_{4,d}$, $\varphi_{5,d}$, $\varphi_{6,d}$ in equation (4) are all inherited angles associated with the parent interval: $\varphi_{1,d}=\varphi_{3,d}=\varphi_{6,d}=\varphi_{1,d-1}$, and $\varphi_{2,d}=\varphi_{4,d}=\varphi_{5,d}=\varphi_{middle,d-1}$. The angles $\varphi_{left,d}$ and $\varphi_{right,d}$ are then interpolated by $$\begin{cases} \varphi_{left,d} = \varphi_{1,d-1} + \text{Offset}_{left} * (\varphi_{middle,d-1} - \varphi_{1,d-1}) / s'_d \\ \varphi_{right,d} = \varphi_{middle,d-1} + \text{Offset}_{right} * (\varphi_{middle,d-1} - \varphi_{1,d-1}) / s'_d \end{cases} \quad (5)$$

where the angles $\varphi_{1,d-1}$ and $\varphi_{middle,d-1}$ are inherited angles associated with the parent interval.

For encoding the first bit $b_{d=1}$ (first iteration), the inherited angle $\varphi_{1,d-1}$ is the angle $\varphi_{node}$ obtained from step 201 and the inherited angle $\varphi_{middle,d-1}$ is associated with the middle point of the initial x-interval (step 104).

For encoding the following bit $b_d$ (following iterations), the inherited angles $\varphi_{1,d-1}$ and $\varphi_{middle,d-1}$ are associated with the parent interval. Dashed line on FIG. 11 illustrates the inheritance link.

For each depth d, an angle $\varphi_{middle,d}$ may be computed by performing an arc tangent function.

For encoding the first bit $b_{d=1}$ (first iteration), the parent angle $\varphi_{middle,0}$ is computed by:

$$\varphi_{middle,0}=ia\tan 2(y_P, x_{lb}+s'_0) \quad (6)$$

where $s'_0=s_0/2$ is half the size of the initial x-interval size $s_0$ (step 104), and $x_{lb}$ is the value of the lower bound of the initial x-interval (step 104).

For encoding the following bits $b_d$ (following iterations), the parent angle $\varphi_{middle,d-1}$ is computed by performing an arc tangent function:

$$\varphi_{middle,d-1}=ia\tan 2(y_P, x_{lb}+s'_{d-1}) \quad (7)$$

where $s'_{d-1}=s_{d-1}/2$ is half the size $s_{d-1}$ of the parent interval, and $x_{lb}$ is the value of the lower bound of the parent interval.

This exemplary embodiment requires performing a single arc tangent function for encoding each bit $b_d$ (equations 6 or 7). It provides thus advantages because it performs the same number of arc tangent function as in prior art while preserving high coding performance and flexibility in the choice of the angles $\varphi_{left,d}$ and $\varphi_{right,d}$.

Figure 12:
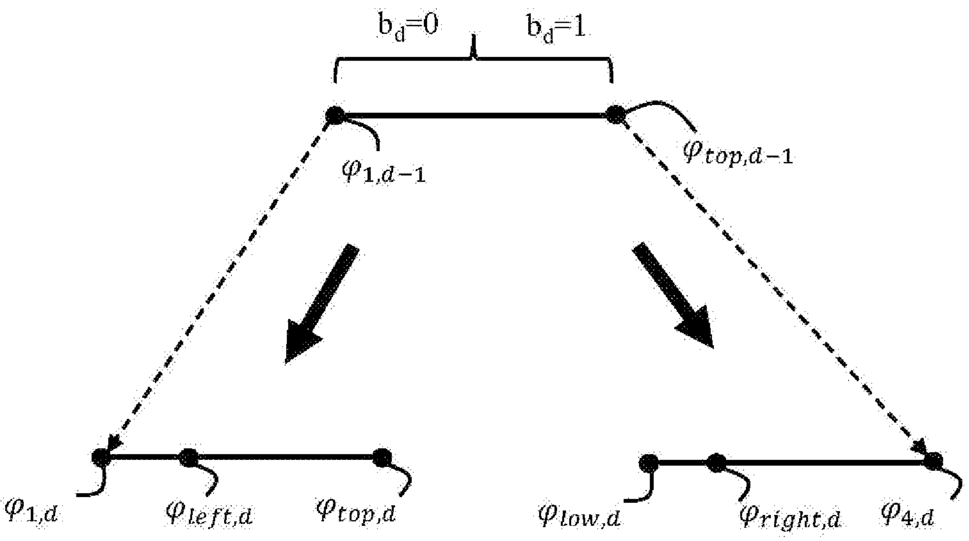
FIG. 12 illustrates an exemplary embodiment for interpolating two angles $\varphi_{left,d}$ and $\varphi_{right,d}$ in accordance with at least one exemplary embodiment.

In one other exemplary embodiment of step 203, illustrated on FIG. 12, the angles $\varphi_{1,d}$, $\varphi_{2,d}$, $\varphi_{3,d}$, $\varphi_{4,d}$, $\varphi_{5,d}$, $\varphi_{6,d}$ in equation (2) are all inherited angles associated with the parent interval: $\varphi_{1,d}=\varphi_{3,d}=\varphi_{5,d}=\varphi_{1,d-1}$, and $\varphi_{2,d}=\varphi_{4,d}=\varphi_{6,d}=\varphi_{top,d-1}$. The angles $\varphi_{left,d}$ and $\varphi_{right,d}$ are interpolated by:

$$\begin{cases} \varphi_{left,d} = \varphi_{1,d-1} + \text{Offset}_{left} * (\varphi_{top,d-1} - \varphi_{1,d-1}) / s_d \\ \varphi_{right,d} = \varphi_{top,d-1} + \text{Offset}_{right} * (\varphi_{1,d-1} - \varphi_{top,d-1}) / s_d \end{cases} \quad (8)$$

where the angles $\varphi_{1,d-1}$ and $\varphi_{top,d-1}$ are inherited angles associated with the parent interval.

For encoding the first bit $b_{d=1}$ (first iteration), the inherited angle $\varphi_{1,d-1}$ is the angle $\varphi_{node}$ obtained from step 201 and the inherited angle $\varphi_{top,d-1}$ is the angle associated with the upper bound of the initial x-interval.

For encoding the following bit $b_d$ (following iterations), the inherited angles $\varphi_{1,d-1}$ and $\varphi_{top,d-1}$ are associated with the parent interval. Dashed line on FIG. 12 illustrates the inheritance link.

At a given depth d, either an angle $\varphi_{top,d}$ associated with the upper bound of the left half interval or an angle $\varphi_{low,d}$ associated with the lower bound of the right half interval is computed by performing an arc tangent function.

For encoding the first bit $b_{d=1}$ (first iteration), the angle $\varphi_{top,0}$ is computed by:

$$\varphi_{top,0}=ia\tan 2(y_P, x_{lb}+s_0) \quad (9)$$

where $s_0$ is the size of the initial x-interval size (step 104), and $x_{lb}$ is the value of the lower bound of the initial x-interval (step 104).

If $b_{d-1}=0$ then the left half interval is the x-interval for the next depth d (next iteration) and the angle $\varphi_{top,d}$ is then computed by performing an arc tangent function.

For encoding the following bit $b_d$ (following iteration), the angle $\varphi_{top,d-1}$ is computed by performing an arc tangent function:

$$\varphi_{top,d-1}=ia\tan 2(y_P, x_{lb}+s_{d-1}) \quad (10)$$

where $s_{d-1}$ is the size of the x-interval size at depth d−1, and $x_{lb}$ is the value of the lower bound of the x-interval at depth d−1.

If $b_{d-1}=1$ then the right half interval is the x-interval for the next depth d and the angle $\varphi_{low,d}$ is then computed by performing an arc tangent function.

For encoding the following bit $b_d$ (following iteration), the angle $\varphi_{low,d-1}$ is computed by:

$$\varphi low,d\text{-}\mathbf{1}=ia\tan 2(y_P, x_{lb}+s_{d-1}) \quad (11)$$

where $s_{d-1}$ is the size of the x-interval at depth d−1, and $x_{lb}$ is the value of the lower bound of the x-interval at depth d−1.

This exemplary embodiment requires performing a single arc tangent function for encoding each bit $b_d$ (equations 9 to 11). It provides thus advantages because it performs a same number of arc tangent function as in prior art while preserving high coding performance and flexibility in the choice of the angles $\varphi_{left,d}$ and $\varphi_{right,d}$.

Figure 13:
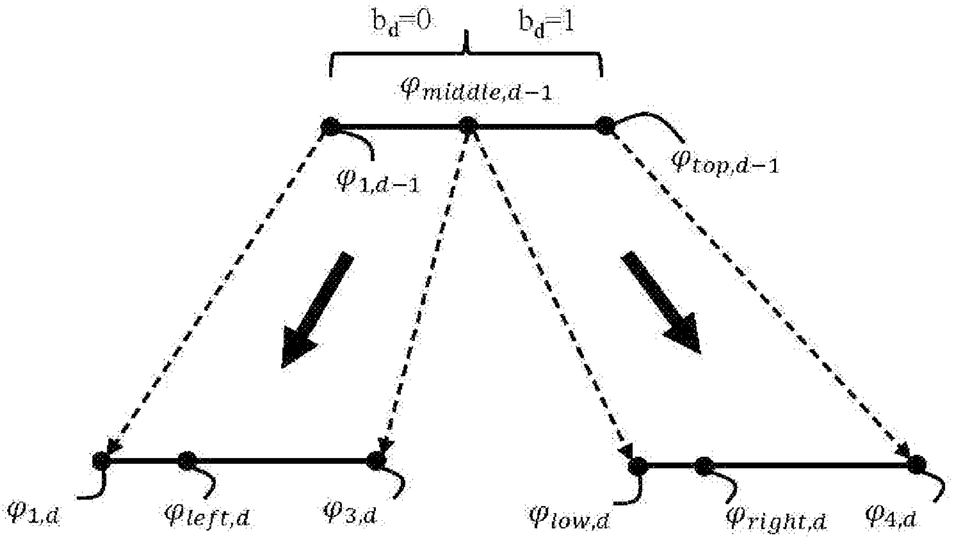
FIG. 13 illustrates a variant of the exemplary embodiment of FIG. 10 for interpolating two angles $\varphi_{left,d}$ and $\varphi_{right,d}$ in accordance with at least one exemplary embodiment.

In a first variant of the exemplary embodiment of FIG. 12, illustrated in FIG. 13, the angle $\varphi_{top,d}$ or the angle $\varphi_{low,d}$ equals to an inherited angle $\varphi_{middle,d-1}$ associated with the middle point of the parent interval.

This first variant provides lower complexity because it does not require performing any arc tangent function for encoding each bit $b_d$, assuming that $\varphi_{middle,d-1}$ has been determined without calling the arc tangent function. Moreover, it preserves high coding performance and flexibility in the choice of the angles $\varphi_{left,d}$ and $\varphi_{right,d}$.

In a second variant of the exemplary embodiment of FIG. 12, the angle $\varphi_{top,d}$ and the angle $\varphi_{low,d}$ are computed, for encoding the first bit $b_d=1$, by equation 10 or 11 and the angles $\varphi_{low,d}$ or the angle $\varphi_{top,d}$, for encoding the following bits $b_d$, equals to the inherited angle $\varphi_{middle,d-1}$ associated with the middle point of the parent interval.

This variant requires only two performing of arc tangent function for encoding a series of bits, lowering thus the complexity of the method and thus the computing resources for implement an azimuthal coding mode while preserving high coding performance (high interpolation precision) and flexibility in the choice of the angles $\varphi_{left,d}$ and $\varphi_{right,d}$.

In a variant of said first or second variant, the inherited angle $\varphi_{middle,d-1}$ is obtained by interpolating two inherited angles $\varphi_{1,d-1}$ and $\varphi_{top,d-1}$ associated with the parent interval:

$$\varphi_{middle,d-1}=(\varphi_{1,d-1}+\varphi_{top,d-1})/2 \quad (12)$$

wherein the angles $\varphi_{1,d-1}$ and $\varphi_{top,d-1}$ are inherited angles associated with the x-interval as above explained in relation with FIGS. 11, 12 and 13.

This variant does not require recursive call to arc tangent functions to perform encoding of a series of bits, thus lowering the complexity of the method and thus the computing resources for implement an azimuthal coding mode while preserving high coding performance and flexibility in the choice of the angles $\varphi_{left,d}$ and $\varphi_{right,d}$.

In another variant of said first or second variant, the inherited angle $\varphi_{middle,d-1}$ is obtained by performing an arc tangent function (equation 6 or 7) when the size of the x-interval is greater than a determined threshold and is interpolated from two inherited angles $\varphi_{1,d-1}$ and $\varphi_{top,d-1}$ according to equation (12) otherwise when the size of the x-interval is lower than the determined threshold.

This variant provides preserves high precision in nodes having important sizes for which the interpolation of equation (12) would provide too unprecise results and thus damage the compression performance.

Alternatively, the inherited angle $\varphi_{middle,d-1}$ is obtained by performing an arc tangent function (equation 6 or 7) when the absolute value of the difference between the angles $\varphi_{1,d-1}$ and $\varphi_{top,d-1}$ is greater than a determined threshold and is interpolated from two inherited angles $\varphi_{1,d-1}$ and $\varphi_{top,d-1}$ according to equation (12) otherwise.

This variant is advantageous as it preserves interpolation precision, and thus compression performance, while ensuring a lower complexity thanks to the interpolation of $\varphi_{middle,d-1}$ once the interval size has become small enough.

In one exemplary embodiment of step 203, the parameter $Off_{left}$ is defined as a difference between a mean position of the center of the left half interval $offset_{left,mid}$ and an offset Offset2, and the parameter $Off_{right}$ is defined as the sum of a mean position of the center of the right half interval $offset_{right,mid}$ and the offset Offset2:

$$Off_{left}=offset_{left,mid}-offset2$$

$$Off_{right}=offset_{right,mid}+offset2$$

The basic idea to obtain good context selection is to obtain angles $\varphi_{left,d}$ and $\varphi_{right,d}$ point close to the center of their respective half intervals. However, it has been observed that optimal compression performance is obtained when angles $\varphi_{left,d}$ and $\varphi_{right,d}$ do not point exactly to the centers of their half interval.

Figure 14:
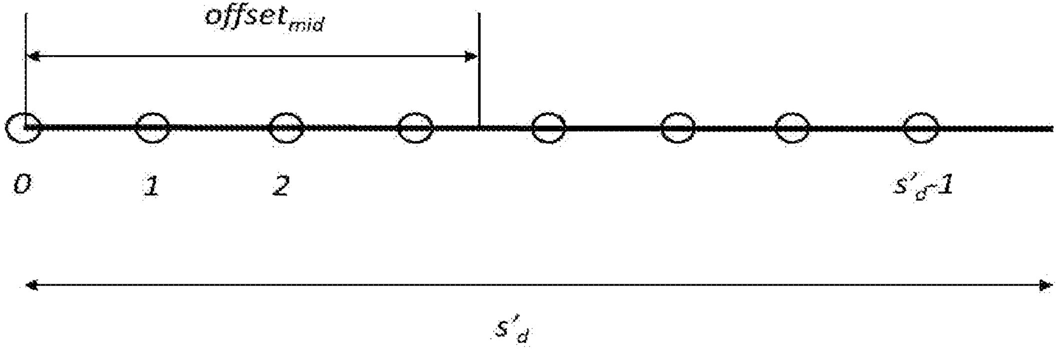
FIG. 14 illustrates an exemplary embodiment for calculating the middle of an interval.

For example, the middle of a left half interval is not the straightforward $(\varphi_{middle,d-1}-\varphi_{1,d-1})/2$ because of the discrete position of the points in this left half interval. Instead, middle of the left half interval is defined as the average positions of all potential points belonging to the left half interval, as depicted on FIG. 14.

Considering a half interval of length $s'_d$, potential points are located at position 0, 1, . . . , $s'_d-1$ from the lower bound of the left half interval. The mean position of the center of the left half interval $offset_{right,mid}$ is then given by:

$$offset_{right,mid}=(0+1+\ldots+s'_d-2+s'_d-1)/s'_d.$$

Now, using arithmetic progression formula, one gets $$offset_{right,mid}=(s'_d-1)s'_d/2s'_d=(s'_d-1)/2=s_d/4-1/2$$

To achieve better compression efficiency, it has been observed that introducing a second offset offset2 as a refinement of the mean position of the center of the left half interval $offset_{left,mid}$ leads to a more efficient selection of the contexts and small extra compression gains are obtained. The basic effect of the second offset Offset2 is to push slightly the left angle $\varphi_{left,d}$ toward the lower bound of the left half interval and the right angle $\varphi_{right,d}$ toward the upper bound of the right half interval.

Same reasoning for the parameter $Off_{right}$ associated with the right half interval.

An exemplary value for offset2 is offset2=2. Also, offset2 may depend on the depth d such that offset2 may equal to 2 for the last depth (i.e. for coding the last bit bid), may equal 1 for the penultimate depth and may equal to 0 for other depths.

Several division operations are performed in the methods 200 and 300. For example, $$offset_{left,mid}=s_d/4-1/2$$

the interpolation itself as a division by $s'_d$ or $s_d$ $$s_{d+1}=s_d/2$$

These division operations may be problematic for practical implementation, but they can practically be replaced by shifting>>operations, in particular in the framework of the current G_PCC TMC13 software. This replacement is doable because the size of nodes are powers of two, such that the lengths of intervals are also powers of two.

$$s_{d+1}=s_d>>1$$

Equation (4) becomes:

$$\begin{cases} \varphi_{left,d}=\varphi_{1,d}+\left(2Off_{left}*(\varphi_{2,d}-\varphi_{3,d})\right)\gg L_d \\ \varphi_{right,d}=\varphi_{4,d}+\left(2Off_{left}*(\varphi_{5,d}-\varphi_{6,d})\right)\gg L_d \end{cases}$$

where $L_d$ is the log 2 of the length $s_d$ of the interval such that the $L_d$'s are recursively obtained by $$L_{d+1}=L_d-1$$

The value $2Off_{left}$ is computed by $$2Off_{left}=2offset_{left,mid}-2offset2=\frac{s_d}{2}-1-2offset2=(s_d\gg 1)-1-2offset2.$$

Figure 15:
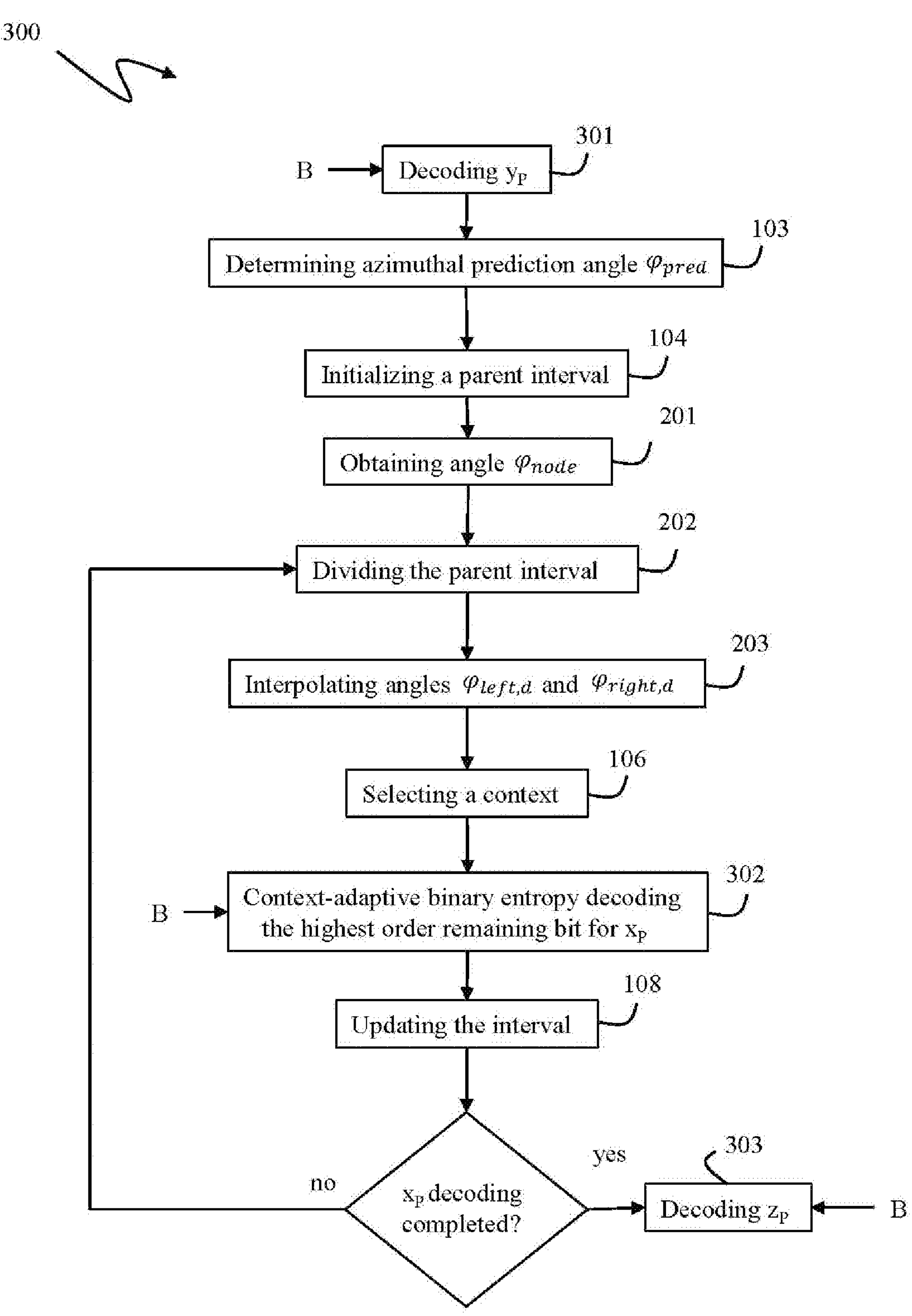
FIG. 15 illustrates a block diagram of steps of a method 300 of decoding a x-coordinate of a point using an azimuthal coding mode in case the azimuthal coding direction is along the x axis in accordance with at least one exemplary embodiment.

FIG. 15 illustrates a block diagram of steps of a method 300 of decoding a x-coordinate of a point using an azimuthal coding mode in case the azimuthal coding direction is along the x axis in accordance with at least one exemplary embodiment.

In the following the selected azimuthal coding direction is along the x axis but an equivalent method 300 may be deduced when the azimuthal coding direction along the y axis by replacing the x-coordinate, x axis by y-coordinate and y-axis respectively and inversely.

The azimuthal coding direction is determined from the x- and y-coordinates $(x_{note}, y_{node})$ representative of the current (leaf) node to which IDCM is applied. Alternatively, the azimuthal coding direction may be decoded from the bitstream B.

In step 301, a point coordinate (here $y_P$) is decoded along the opposite direction (here the y axis) from the bitstream B.

In step 103, an azimuthal prediction angle $\varphi_{pred}$ is determined for the point P. An x-interval along the x axis is initialized (step 104). The azimuthal angle $\varphi_{al}$ of a (closest) already decoded point is used and a multiple n of an elementary azimuthal shift is determined by the decoder. Alternatively, the multiple n is decoded from the bitstream B.

In step 104, an interval (here x-interval) along azimuthal coding direction (here x axis) is initialized.

In step 201, an angle of the current node $\varphi_{node}$ is obtained by equation (1). The coordinate $y_P$ has been decoded from the bitstream and nodepos_x is a known parameter of the IDCM.

In step 202, the x-interval is divided into two half intervals: a left half interval and a right half interval. The x-interval is either the x-interval initialized in step 104 or an x-interval used for decoding a previous bit $b_d-1$.

In step 203, a left angle $\varphi_{left,d}$ associated with the left half interval and a right angle $\varphi_{right,d}$ associated with the right half interval are interpolated from at least one inherited angle associated with the parent interval.

In step 106, a context is selected as described in relation with the method 400 of FIG. 16.

In step 302, the highest ordered remaining bit $b_d$ for $x_P$ is context-adaptive binary entropy decoded, from the bitstream B, by using the selected context. This bit indicates that $x_P$ is located either in the left half interval ($b_d=0$) or in the right half interval ($b_d=1$).

In one exemplary embodiment, the context-adaptive binary entropy decoding is a Context-Adaptive Binary Arithmetic Coding (CABAC).

In step 108, the x-interval is updated as the half interval to which $x_P$ belongs (as indicated by the decoded bit).

Next, the method checks if the decoding of the coordinate $x_P$ is completed or not.

If the $x_P$ decoding is completed, in step 303, the remaining coordinate $z_P$ is decoded from the bitstream B.

If the $x_P$ decoding is not completed, loop to step 202 to decode a next bit $b_{d+1}$ of $x_P$.

The exemplary embodiments and variants of the method 200 apply to the method 300.

FIG. 16 illustrates a block diagram of steps of a method 400 of selecting a context in accordance with an exemplary embodiment of the present invention.

In step 410, the apparent angle $AA_d$ associated with the x-interval is estimated. The apparent angle $AA_d$ is a representation of the x-interval angle seen from the sensor that capture the current point (current leaf node) at a particular depth d. Thus, the apparent angle $AA_d$ decreases together with the x-interval updates from a depth d to a depth d+1 (step 108).

Figure 17:
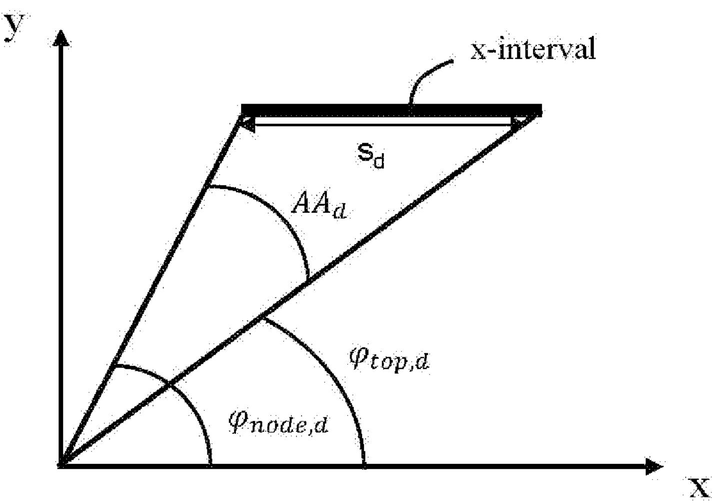
FIG. 17 illustrates an example for estimating an apparent angle associated with an interval.

In one exemplary embodiment of step 410, illustrated on FIG. 17, the apparent angle $AA_d$ associated with the x-interval is estimated based on at least one of an angle $\varphi_{node,d}$ associated with the lower bound of the x-interval, an angle $\varphi_{top,d}$ associated with the upper bound of the x-interval and an angle $\varphi_{middle,d}$ associated with the middle point of the interval.

For example, the angle $\varphi_{node,d}$ may be given by equation (3), the angle $\varphi_{top,d}$ may be obtained by:

$$\varphi_{top,d}=ia\ \tan\ 2(y_P,x_{lb}+s_d)$$

where $s_d$ is the x-interval size at depth d, and $x_{lb}$ is the value of the lower bound of the x-interval at depth d, and the angle $\varphi_{middle,d}$ is given by:

$$\varphi_{middle,d}=\frac{\varphi_{node,d}+\varphi_{top,d}}{2}$$

In a variant of said exemplary embodiment of step 410, the apparent angle $AA_d$ is estimated based on the angles $\varphi_{node,d}$ and $\varphi_{top,d}$.

For example, $AA_d=\alpha*|\varphi_{top,d}-\varphi_{node,d}|$ where $\alpha$ is a parameter that makes the apparent angle $AA_d$ proportional to the angle difference between angles $\varphi_{node,d}$ and $\varphi_{top,d}$. For example, the value of $\alpha$ may be 1 or 2.

In another variant of said exemplary embodiment of step 410, the apparent angle $AA_d$ is estimated based on the angles $\varphi_{node,d}$ and $\varphi_{middle,d}$.

For example, $AA_d=\alpha*|\varphi_{node,d}-\varphi_{middle,d}|$ where $\alpha$ is a parameter that makes the apparent angle $AA_d$ proportional to the angle difference between angles $\varphi_{node,d}$ and $\varphi_{middle,d}$. For example, the value of $\alpha$ may be 1 or 2.

In another variant of said exemplary embodiment of step 410, the apparent angle $AA_d$ is estimated based on the angles $\varphi_{top,d}$ and $\varphi_{middle,d}$.

For example, $AA_d=\alpha*|\varphi_{top,d}-\varphi_{middle,d}|$. For example, the value of $\alpha$ may be 1 or 2.

In one exemplary embodiment of step 410, the apparent angle $AA_d$ is estimated based on the x-interval size $s_d$ at depth d and the distance r between the current point (current leaf node) and the sensor that captured the current point. For example, $AA_d=s_d/r$.

In step 420, a context is selected based on the relative magnitudes of the elementary azimuthal angle $\Delta\varphi$ and the apparent angle $AA_d$.

In one exemplary embodiment of step 420, the relative magnitudes of $\Delta\varphi$ and $AA_d$ can be assessed by a ratio $\Delta\varphi/AA_d$.

This exemplary embodiment is advantageous because the ratio $\Delta\varphi/AA_d$ assess the prediction quality of the predicted azimuthal angle associated with the current point.

Basically, the ratio $\Delta\varphi/AA_d$ depends on the x-interval size, the distance of a current node (current point) from the sensor that captured this point and the value of the elementary azimuthal angle $\Delta\varphi$. If a current leaf node is very far from a sensor or the interval size is very small, then the apparent angle $AA_d$ is so small that the ratio $\Delta\varphi/AA_d$ becomes much larger than 1 and the predicted azimuthal angle associated with the current point has bad prediction quality. On the other hand, if a current leaf node is very close to a sensor or the interval size is very large, then the apparent angle $AA_d$ is very large, the ratio $\Delta\varphi/AA_d$ becomes much smaller than 1, and the predicted azimuthal angle associated with the current point has bad prediction quality. In between, when the ratio $\Delta\varphi/AA_d$ is close to 1, the prediction quality of the predicted azimuthal angle associated with the current point is maximum.

In a variant of said exemplary embodiment of step 420, contexts are grouped into at least two context subsets based on a range of particular values of the ratio $\Delta\varphi/AA_d$, and selecting the context comprises selecting (sub-step 421) a context subset based on the range of particular values and the ratio $\Delta\varphi/AA_d$, and selecting (sub-step 422) a context from the contexts of said selected context subset.

Each context subset corresponds then to a particular level of the prediction quality of the predicted azimuthal angle $\varphi_{pred}$.

Figure 7:
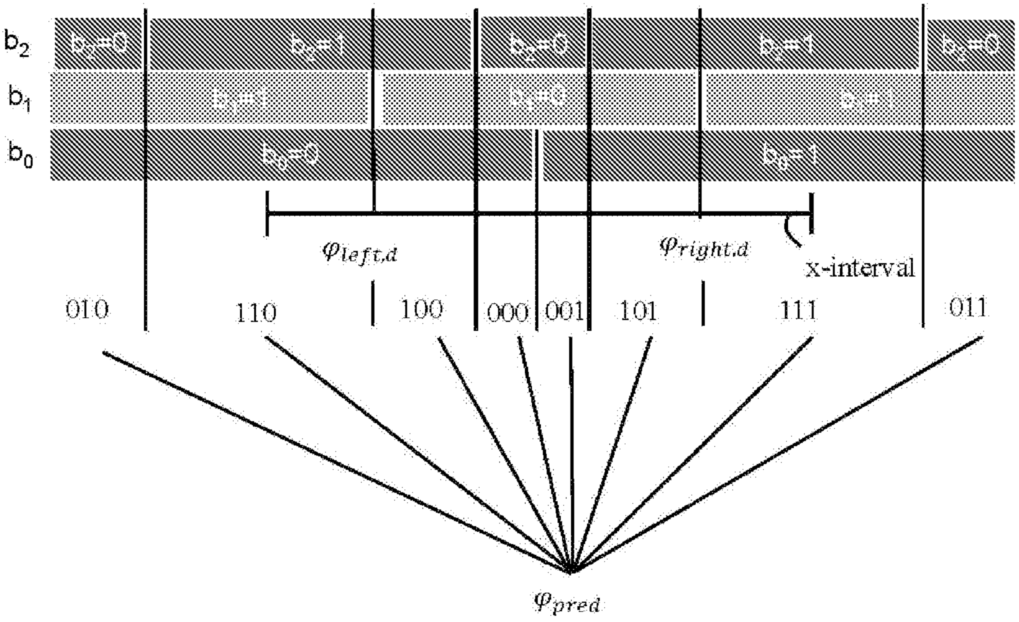
FIG. 7 illustrates the G-PCC context selection process in accordance with prior art.
Figure 8:
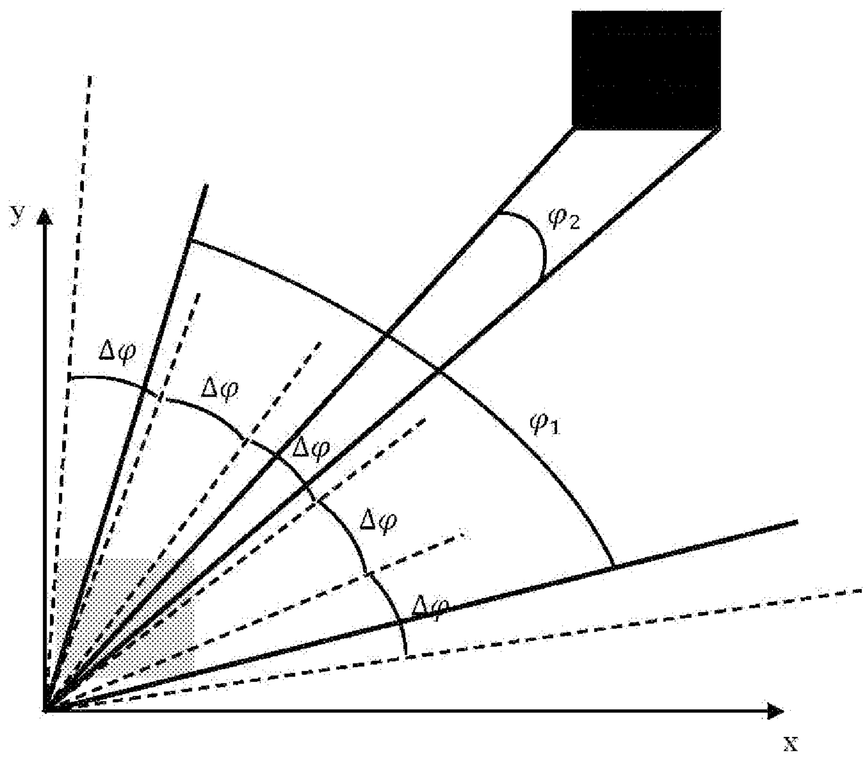
FIG. 8 illustrates examples of low quality of a prediction azimuthal angle caused by either too large or too small distance, where two nodes have the same node (interval) size, but they have different distance from the sensor of the spinning sensor head.
Figure 9:
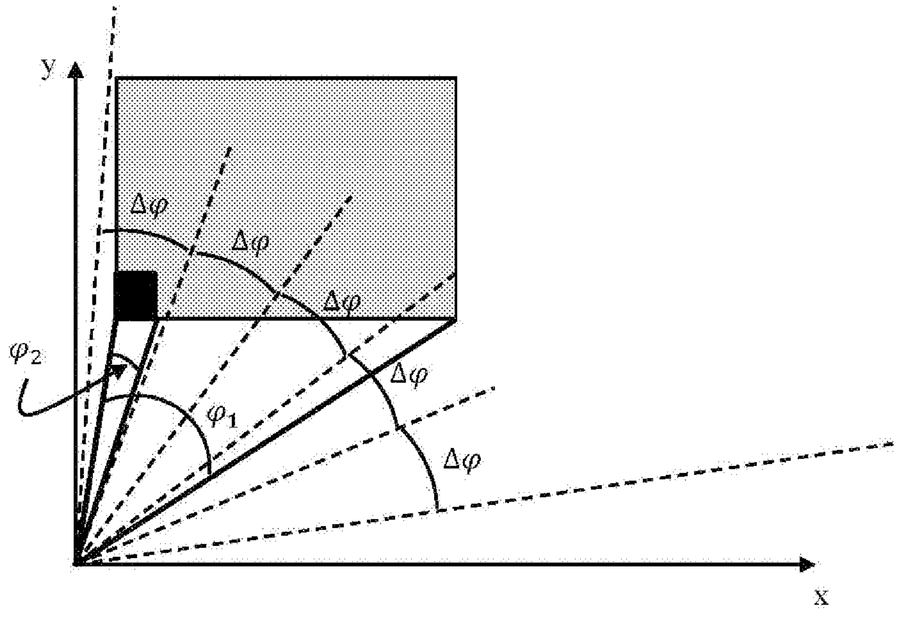
FIG. 9 illustrates examples of low quality of a prediction azimuthal angle caused by too big or too small apparent angles associated with the x-interval relative to the elementary azimuthal angle $\Delta\varphi$.

Each context subsets may comprise 8 contexts as in prior art depicted on FIG. 7 but the present invention extends to context subsets comprising any number of contexts.

In a variant, the context is selected from the contexts of said selected context as explained in relation with FIG. 7 from the predicted azimuthal angle $\varphi_{pred}$ and the two angles $\varphi_{left,d}$ and $\varphi_{right,d}$.

The number of context subsets depends on the number of said particular values. Any particular values of the ratio $\Delta\varphi/AA_d$ may be used.

For example, three context subsets C0, C1 and C2 are defined from two particular values TH1 and TH2 of the ratio $\Delta\varphi/D_d$.

For example, if $\Delta\varphi/AA_d<TH1$ then the context subset C0 is selected; if $(\Delta\varphi/AA_d \geq TH1)$ and $(\Delta\varphi/AA_d<TH2)$ then the context subset C1 is selected, and if $\Delta\varphi/AA_d \geq 1$ then the context subset C2 is selected.

Figure 18:
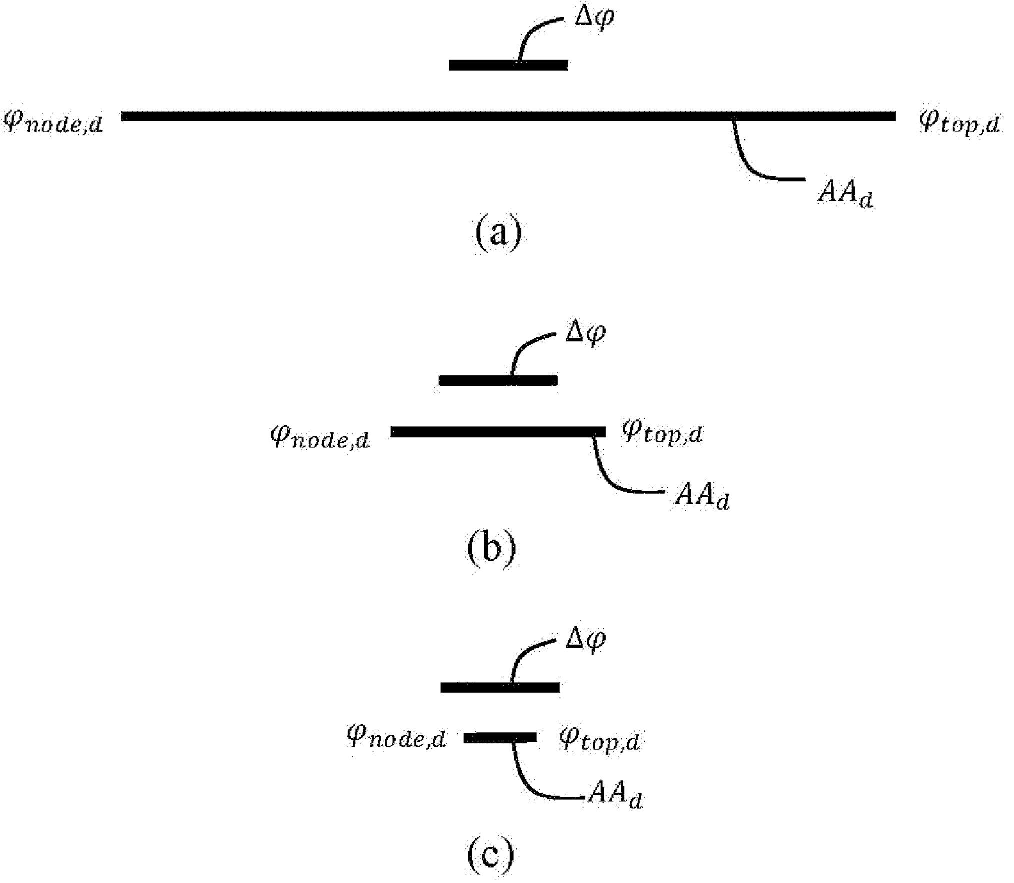
FIG. 18 illustrates an example of three values of the ratio $\Delta\varphi/AA_d$.

In an example, illustrated on FIG. 18, TH1=⅔ and TH2=1. In the case (a), the elementary azimuthal angle $\Delta\varphi$ is much smaller relative to the apparent angle $AA_d$, the ratio $\Delta\varphi/AA_d<2/3$. In that case a first context subset may be selected and indicates that the predicted azimuthal angle $\varphi_{pred}$ is into a narrow range within the current node. In the case (b), the elementary azimuthal angle $\Delta\varphi$ is a little smaller relative to the apparent angle $AA_d$, the ratio $2/3 \Delta\varphi/AA_d<1$. In that case, the prediction quality of the predicted azimuthal angle $\varphi_{pred}$ is the best among the three cases. In the case (c), the apparent angle $AA_d$ may be so small that the elementary azimuthal angle $\Delta\varphi$ is larger than it, the ratio $\Delta\varphi/AA_d>1$. In that case, the predicted azimuthal angle $\varphi_{pred}$ (obtained from the elementary azimuthal angle $\Delta\varphi$) provides no relevant information for the position of the current point in the current node.

In another example, a single particular value TH1 may be used. For example, TH1=⅔.

In another example, three particular values TH1, TH2 and TH3 may be used. For example, TH1=⅓, TH2=⅔ and TH3=1.

In one exemplary embodiment of sub-steps 421 and 422, the context is selected from a context table ctxTable_T having as first entry a context subset index ctxSetIdx indicating a selected context subset, and as second entry a context index cxtIdx indicating a selected context in the selected context subset.

A context is then selected by, first, selecting (sub-step 421) a first context subset index ctxSetIdx based on the range of particular values and the ratio $\Delta\varphi/AA_d$, and, next, by selecting a context index cxtIdx indicating a selected context in the selected context subset.

For example, the context index cxtIdx is selected as explained in relation with FIG. 7 from the predicted azimuthal angle $\varphi_{pred}$ and the two angles $\varphi_{left,d}$ and $\varphi_{right,d}$.

Figure 19:
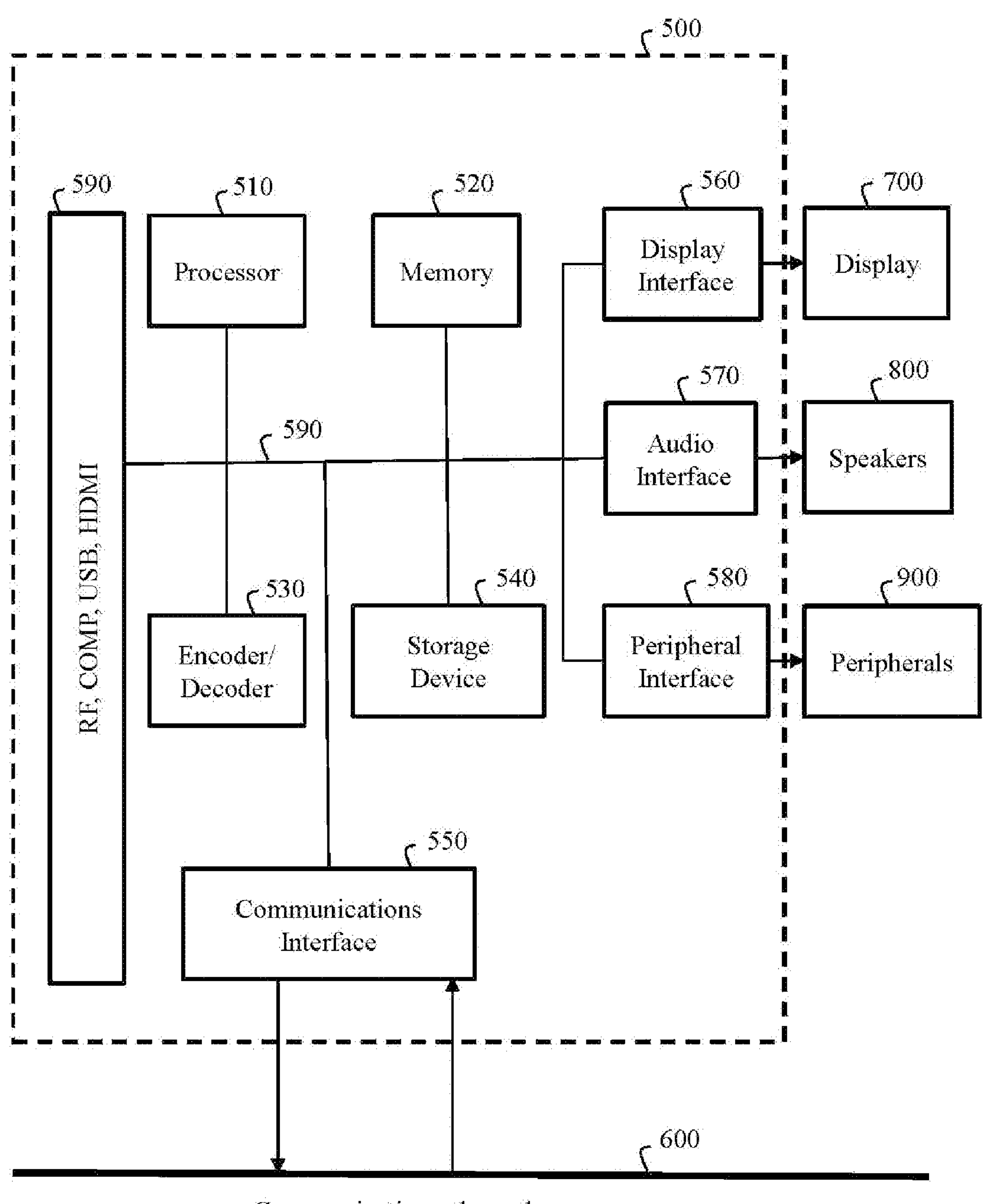
FIG. 19 illustrates a schematic block diagram of an example of a system in which various aspects and exemplary embodiments are implemented.

FIG. 19 shows a schematic block diagram illustrating an example of a system in which various aspects and exemplary embodiments are implemented.

System 500 may be embodied as one or more devices including the various components described below. In various embodiments, the system 500 may be configured to implement one or more of the aspects described in the present application.

Examples of equipment that may form all or part of the system 500 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), “caves” (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 500, singly or in combination, may be embodied in a single integrated circuit (IC), multiple ICs, and/or discrete components. For example, in at least one embodiment, the processing and encoder/decoder elements of system 500 may be distributed across multiple ICs and/or discrete components. In various embodiments, the system 500 may be communicatively coupled to other similar systems, or to other electronic devices, via, for example, a communications bus or through dedicated input and/or output ports.

The system 500 may include at least one processor 510 configured to execute instructions loaded therein for implementing, for example, the various aspects described in the present application. Processor 510 may include embedded memory, input output interface, and various other circuitries as known in the art. The system 500 may include at least one memory 520 (for example a volatile memory device and/or a non-volatile memory device). System 500 may include a storage device 540, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 540 may include an internal storage device, an attached storage device, and/or a network accessible storage device, as non-limiting examples.

The system 500 may include an encoder/decoder module 530 configured, for example, to process data to provide encoded/decoded point cloud geometry data, and the encoder/decoder module 530 may include its own processor and memory. The encoder/decoder module 530 may represent module(s) that may be included in a device to perform the encoding and/or decoding functions. As is known, a device may include one or both of the encoding and decoding modules. Additionally, encoder/decoder module 530 may be implemented as a separate element of system 500 or may be incorporated within processor 510 as a combination of hardware and software as known to those skilled in the art.

Program code to be loaded onto processor 510 or encoder/decoder 530 to perform the various aspects described in the present application may be stored in storage device 540 and subsequently loaded onto memory 520 for execution by processor 510. In accordance with various embodiments, one or more of processor 510, memory 520, storage device 540, and encoder/decoder module 530 may store one or more of various items during the performance of the processes described in the present application. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 510 and/or the encoder/decoder module 530 may be used to store instructions and to provide working memory for processing that may be performed during encoding or decoding.

In other embodiments, however, a memory external to the processing device (for example, the processing device may be either the processor 510 or the encoder/decoder module 530) may be used for one or more of these functions. The external memory may be the memory 520 and/or the storage device 540, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), VVC (Versatile Video Coding), or MPEG-I part 5 or part 9.

The input to the elements of system 500 may be provided through various input devices as indicated in block 590. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various exemplary embodiments, the input devices of block 590 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 500 to other electronic devices across USB and/or HDMI connections. It is to be understood that various aspects of input processing, for example, Reed-Solomon error correction, may be implemented, for example, within a separate input processing IC or within processor 510 as necessary. Similarly, aspects of USB or HDMI interface processing may be implemented within separate interface ICs or within processor 510 as necessary. The demodulated, error corrected, and demultiplexed stream may be provided to various processing elements, including, for example, processor 510, and encoder/decoder 530 operating in combination with the memory and storage elements to process the data stream as necessary for presentation on an output device.

Various elements of system 500 may be provided within an integrated housing. Within the integrated housing, the various elements may be interconnected and transmit data therebetween using suitable connection arrangement 590, for example, an internal bus as known in the art, including the I2C bus, wiring, and printed circuit boards.

The system 500 may include communication interface 550 that enables communication with other devices via communication channel 500. The communication interface 550 may include, but is not limited to, a transceiver configured to transmit and to receive data over communication channel 600. The communication interface 550 may include, but is not limited to, a modem or network card and the communication channel 600 may be implemented, for example, within a wired and/or a wireless medium.

Data may be streamed to the system 500, in various embodiments, using a Wi-Fi network such as IEEE 802.11. The Wi-Fi signal of these embodiments may be received over the communications channel 600 and the communications interface 550 which are adapted for Wi-Fi communications. The communications channel 500 of these embodiments may be typically connected to an access point or router that provides access to outside networks including the Internet for allowing streaming applications and other over-the-top communications.

Other embodiments may provide streamed data to the system 500 using a set-top box that delivers the data over the HDMI connection of the input block 590.

Still other embodiments may provide streamed data to the system 500 using the RF connection of the input block 590.

The streamed data may be used as a way for signaling information used by the system 500. The signaling information may comprise the bitstream B and/or information such a number of points of a point cloud, coded bit ($b_d$) indicating which of two half intervals the point coordinate belongs to, an azimuthal coding direction, point coordinates, multiple n of an elementary azimuthal shift azimuthal, an elementary azimuthal shift azimuthal, a parameter nodepos_x.

It is to be appreciated that signaling may be accomplished in a variety of ways. For example, one or more syntax elements, flags, and so forth may be used to signal information to a corresponding decoder in various embodiments.

The system 500 may provide an output signal to various output devices, including a display 700, speakers 800, and other peripheral devices 900. The other peripheral devices 900 may include, in various examples of embodiments, one or more of a stand-alone DVR, a disk player, a stereo system, a lighting system, and other devices that provide a function based on the output of the system 500.

In various embodiments, control signals may be communicated between the system 500 and the display 700, speakers 800, or other peripheral devices 900 using signaling such as AV.Link (Audio/Video Link), CEO (Consumer Electronics Control), or other communications protocols that enable device-to-device control with or without user intervention.

The output devices may be communicatively coupled to system 500 via dedicated connections through respective interfaces 560, 570, and 580.

Alternatively, the output devices may be connected to system 500 using the communications channel 600 via the communications interface 550. The display 700 and speakers 800 may be integrated in a single unit with the other components of system 500 in an electronic device such as, for example, a television.

In various embodiments, the display interface 560 may include a display driver, such as, for example, a timing controller (T Con) chip.

The display 700 and speaker 800 may alternatively be separate from one or more of the other components, for example, if the RF portion of input 590 is part of a separate set-top box. In various embodiments in which the display 700 and speakers 800 may be external components, the output signal may be provided via dedicated output connections, including, for example, HDMI ports, USB ports, or COMP outputs.

In FIG. 1-19, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 510 or by hardware, or by a combination of hardware and software. As a non-limiting example, the embodiments may be also implemented by one or more integrated circuits. The memory 520 may be of any type appropriate to the technical environment and may be implemented using any appropriate data storage technology, such as optical memory devices, magnetic memory devices, semiconductor-based memory devices, fixed memory, and removable memory, as non-limiting examples. The processor 510 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one exemplary embodiment" or "an exemplary embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one exemplary embodiment" or "in an exemplary embodiment" or "in one implementation" or "in an implementation", as well any other variations, appearing in various places throughout this application are not necessarily all referring to the same embodiment.

Similarly, reference herein to "in accordance with an exemplary embodiment/example/implementation" or "in an exemplary embodiment/example/implementation", as well as other variations thereof, is frequently used to convey that a particular feature, structure, or characteristic (described in connection with the exemplary embodiment/example/implementation) may be included in at least one exemplary embodiment/example/implementation. Thus, the appearances of the expression "in accordance with an exemplary embodiment/example/implementation" or "in an exemplary embodiment/example/implementation" in various places in the specification are not necessarily all referring to the same exemplary embodiment/example/implementation, nor are separate or alternative exemplary embodiment/examples/implementation necessarily mutually exclusive of other exemplary embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by a decoder. In various embodiments, such processes also, or alternatively, include processes performed by a decoder of various implementations described in this application, for example, As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to quantizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular information such a number of points of a point cloud, coded bit ($b_d$) indicating which of two half intervals the point coordinate belongs to, an azimuthal coding direction, point coordinates, multiple n of an elementary azimuthal shift azimuthal, an elementary azimuthal shift azimuthal, a parameter nodepos_x. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding a point cloud into a bitstream of encoded point cloud data representing a physical object, the method comprising an azimuthal coding mode providing a series of bits for encoding a coordinate of a point of the point cloud, wherein the method comprises:

dividing an interval, to which the point coordinate belongs to, into a left half interval and a right half interval;

selecting a context based on an apparent angle ($AA_d$) representing an interval angle seen from a sensor that captured the point; and context-adaptive binary entropy encoding a bit ($b_d$) of the series of bits, into the bitstream, based on the selected context, the encoded bit ($b_d$) indicating which of the two half intervals the point coordinate belongs to;

wherein the apparent angle ($AA_d$) is estimated based on at least one of a first angle (φ (node, d)) associated with a lower bound of the interval, a second angle (φ (top, d)) associated with an upper bound of the interval and a third angle (φ (middle, d)) associated with a middle point of the interval;

wherein the apparent angle ($AA_d$) is estimated based on the first angle (φ (node, d)) and the second angle (φ (top, d));

wherein the context is selected based on relative magnitudes of an elementary azimuthal angle (Δφ) and the apparent angle ($AA_d$).

2. The method of claim 1, wherein the apparent angle ($AA_d$) is estimated based on an interval size ($s_d$) and a distance (r) between the point and the sensor that captured the point.

3. The method of claim 1, wherein the context is selected based on a ratio between the elementary azimuthal angle (Δφ) over the apparent angle ($AA_d$).

4. The method of claim 3, wherein contexts are grouped into at least two context subsets based on a range of particular values of the ratio, and selecting the context comprises:

selecting a context subset based on the range of particular values and the ratio, and selecting a context from the contexts of the selected context subset;

wherein each context subset corresponds to a different prediction quality level of the predicted azimuthal angle $\varphi_{pred}$, where the corresponding prediction quality level is low when the ratio is much larger than 1 or much smaller than 1, and the corresponding prediction quality level is high when the ratio is close to 1;

wherein selecting a context from the contexts of the selected context subset comprise:

selecting a context subset from the at least two context subsets based on a comparison of the ratio with one or more thresholds; and selecting a context from the selected context subset based on a comparison of the predicted azimuthal angle with a left angle ($\varphi_{left,d}$) and a right angle ($\varphi_{right,d}$).

5. The method of claim 4, wherein selecting the context from the contexts of the selected context subset depends on a predicted azimuthal angle (φ_pred) associated with the point and a left angle ($\varphi_{left,d}$) associated with the left half interval and a right angle ($\varphi_{right,d}$) associated with the right half interval.

6. The method of claim 4, wherein the context is selected from a context table ($ctxTable_T$) having as first entry a context subset index (ctxSetIdx) indicating a selected context subset, and as a second entry a context index (cxtIdx) indicating a selected context in the selected context subset.

7. A method of decoding a point cloud from a bitstream of encoded point cloud data representing a physical object, the method comprising an azimuthal coding mode providing a series of bits for decoding a coordinate of a point of the point cloud, wherein the method comprises:

dividing an interval, to which the point coordinate belongs to, into a left half interval and a right half interval;

selecting a context based on an apparent angle ($AA_d$) representing an interval angle seen from a sensor that captured the point; and context-adaptive binary entropy decoding a bit ($b_d$), from the bitstream, based on the selected context, the decoded bit ($b_d$) indicating which of the two half intervals the point coordinate belongs to;

wherein the apparent angle ($AA_d$) is estimated based on at least one of a first angle (φ (node, d)) associated with a lower bound of the interval, a second angle (φ (top, d)) associated with an upper bound of the interval and a third angle (φ (middle, d)) associated with a middle point of the interval;

wherein the apparent angle ($AA_d$) is estimated based on the first angle (φ (node, d)) and the second angle (φ (top, d));

wherein the context is selected based on relative magnitudes of an elementary azimuthal angle (Δφ) and the apparent angle ($AA_d$).

8. A non-transitory computer-readable storage medium having stored thereon instructions that, when executed by one or more processors, cause the one or more processors to carry out a method of encoding a point cloud from a bitstream of encoded point cloud data representing a physical object, the method comprising an azimuthal coding mode providing a series of bits for encoding a coordinate of a point of the point cloud, wherein the method comprises:

dividing an interval, to which the point coordinate belongs to, into a left half interval and a right half interval;

selecting a context based on an apparent angle representing an interval angle seen from a sensor that captured the point; and context-adaptive binary entropy encoding a bit of the series of bits, into the bitstream, based on the selected context, said coded bit indicating which of the two half intervals the point coordinate belongs to;

wherein the apparent angle ($AA_d$) is estimated based on at least one of a first angle (φ (node, d)) associated with a lower bound of the interval, a second angle (φ (top, d)) associated with an upper bound of the interval and a third angle (φ (middle, d)) associated with a middle point of the interval;

wherein the apparent angle ($AA_d$) is estimated based on the first angle (φ (node, d)) and the second angle (φ (top, d));

wherein the context is selected based on relative magnitudes of an elementary azimuthal angle (Δφ) and the apparent angle ($AA_d$).

9. The non-transitory computer-readable storage medium of claim 8, wherein the apparent angle ($AA_d$) is estimated based on an interval size ($s_d$) and a distance (r) between the point and the sensor that captured the point.

10. The non-transitory computer-readable storage medium of claim 8, wherein the context is selected based on a ratio between the elementary azimuthal angle (Δφ) over the apparent angle ($AA_d$).

11. The non-transitory computer-readable storage medium of claim 10, wherein contexts are grouped into at least two context subsets based on a range of particular values of the ratio, and selecting the context comprises:

selecting a context subset based on the range of particular values and the ratio; and selecting a context from the contexts of the selected context subset;

wherein each context subset corresponds to a different prediction quality level of the predicted azimuthal angle ($\varphi_{pred}$), where the corresponding prediction quality level is low when the ratio is much larger than 1 or much smaller than 1, and the corresponding prediction quality level is high when the ratio is close to 1;

wherein selecting a context from the contexts of the selected context subset comprise:

selecting a context subset from the at least two context subsets based on a comparison of the ratio with one or more thresholds; and selecting a context from the selected context subset based on a comparison of the predicted azimuthal angle with a left angle ($\varphi_{left,d}$) and a right angle ($\varphi_{right,d}$).

12. The method non-transitory computer-readable storage medium of claim 11, wherein selecting the context from the contexts of the selected context subset depends on a predicted azimuthal angle ($\varphi_{pred}$) associated with the point and a left angle ($\varphi_{left,d}$) associated with the left half interval and a right angle ($\varphi_{right,d}$) associated with the right half interval.

13. The method non-transitory computer-readable storage medium of claim 11, wherein the context is selected from a context table ($ctxTable_T$) having as first entry a context subset index (ctxSetIdx) indicating a selected context subset, and as a second entry a context index (cxtIdx) indicating a selected context in the selected context subset.

* * * * *